United States Patent [19]

Martin

[11] 4,164,487
[45] Aug. 14, 1979

[54] WATER-THINNABLE MIXTURES OF BASE-NEUTRALIZED PRODUCTS OF REACTION OF $H_3PO_4$ WITH POLYETHER EPOXIDES AND WITH OTHER TYPE EPOXIDES

[75] Inventor: Patrick H. Martin, Danville, Calif.

[73] Assignee: The Dow Chemical Company, Midland, Mich.

[21] Appl. No.: 853,167

[22] Filed: Nov. 21, 1977

Related U.S. Application Data

[63] Continuation-in-part of Ser. No. 753,765, Dec. 23, 1976, abandoned, and a continuation-in-part of Ser. No. 753,763, Dec. 23, 1976, abandoned.

[51] Int. Cl.² .............................................. C08L 63/00
[52] U.S. Cl. ...................... 260/29.2 EP; 260/18 PF; 525/523; 427/195; 428/418; 528/103
[58] Field of Search .................. 260/29.2 EP, 47 EP, 260/2 EP, 29.3, 830 TW, 2 P, 18 PF; 428/418

[56] References Cited

U.S. PATENT DOCUMENTS

| 2,541,027 | 2/1951 | Bradley | 260/2 EC |
|---|---|---|---|
| 2,712,535 | 7/1955 | Fisch | 260/835 |
| 2,723,971 | 11/1955 | Cupery | 260/2 EC |
| 2,916,473 | 12/1959 | Bullock et al. | 260/47 |
| 3,514,418 | 5/1970 | Schwarzer | 260/28 |
| 3,859,255 | 1/1975 | Heer et al. | 260/51 EP |
| 3,962,165 | 6/1976 | Bosso | 260/837 R |
| 4,059,550 | 11/1977 | Shimp | 260/29.4 R |

Primary Examiner—Theodore E. Pertilla
Attorney, Agent, or Firm—R. R. Stringham

[57] ABSTRACT

The utility, as coatings, of water-thinnable, base-neutralized $H_3PO_4$/polyether epoxide reaction products, is improved by admixture therewith of the base-neutralized reaction products of phosphoric acid with various other kinds of epoxides. Of particular value are such mixtures in which the latter products are derived from methylol- or lower alkoxymethyl-substituted epoxides.

33 Claims, No Drawings

WATER-THINNABLE MIXTURES OF BASE-NEUTRALIZED PRODUCTS OF REACTION OF H₃PO₄ WITH POLYETHER EPOXIDES AND WITH OTHER TYPE EPOXIDES

CROSS REFERENCE TO RELATED APPLICATIONS

The present application is a continuation-in-part of co-pending Applications Ser. Nos. 753,763 and 753,765, both filed on Dec. 23, 1976, and now abandoned. A companion application (to the present one) Ser. No. 853,168, filed Nov. 21, 1977, is a continuation-in-part of Application Ser. No. 753,765 and is directed to polyether epoxide/H₃PO₄ reaction products (referred to in the preceding abstract).

BACKGROUND OF THE INVENTION

Base-neutralized reaction products of phosphoric acid with polyether epoxides ($E^1$) of the nominal formula

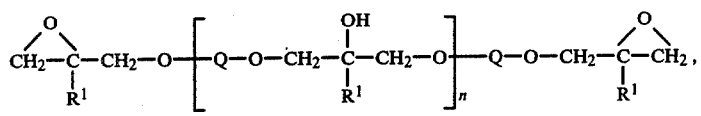   (a)

or

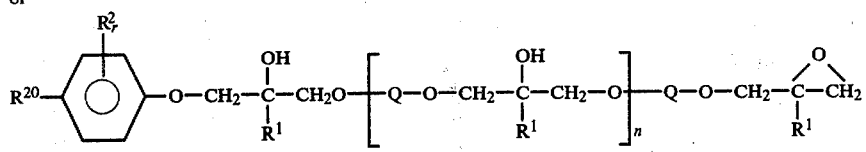   (q)

wherein Q, n, $R^1$, $R^2$, r and $R^{20}$ are as defined below, have been found to be water-thinnable and to have utility as curable coatings. When a fugitive base is employed to neutralize the acid/epoxide products, the coatings are of particular value as linings for food and beverage cans. The cured coatings are hydrophobic and thermoset.

Q, n, $R^1$, $R^2$, r and $R^{20}$, in the preceding formula, are defined as follows:

Q, independently in each occurrence, is

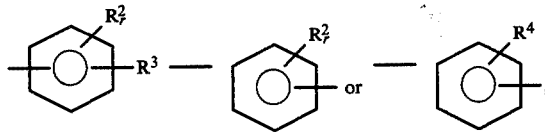

n is an integer of from 0 to 40,
r is zero, 1 or 2, and independently in each occurrence,
$R^1$ is H, methyl or ethyl,
$R^2$ is —Br, —Cl, or a $C_1$ to 4 alkyl or alkenyl group,
$R^3$ is a $C_1$-$C_4$ alkylene or alkenylene group, >C(CF₃)₂, —CO—, —SO₂—, —S—, —O— or a valence bond,
$R^4$ is —Br, —Cl or a $C_1$ to $C_4$ alkyl or alkenyl group, and
$R^{20}$ is H or alkyl of 1 to 12 carbons.

The background and significance of the foregoing discovery and the manner of making, neutralizing and using the $E^1$/acid reaction products are fully set forth in the above identified companion Application, Ser. No. 853,168, the disclosure of which is incorporated herein by reference. In addition, methods of preparing the neutralized materials are summarized in the present specification.

The foregoing water-thinned products, when freed of water and desalified, can be cured simply by heating. However, the cure times required are longer than are generally desirable for commercial coating operations and curing agents, such as melamine resins, for example, will ordinarily be incorporated with the water-thinned materials when they are applied to the substrate to be coated.

Base-neutralized reaction products of phosphoric acid with various methylol- or lower alkoxymethyl-substituted epoxides have now beeen found to be compatible with the water-thinned, $E^1$-derived resin dispersions and to render them rapidly self-converting. It has also been found that the ability of the dispersions to wet various types of substrates can be manipulated to advantage by choice of other substituents in the latter types of curing agents. Other properties of the aqueous dispersions of the neutralized acid/$E^1$ products, and/or of the cured coatings deriveable therefrom, can be modified to advantage by incorporation of (neutralized) reaction products of phosphoric acid with various other ($E^2$) type epoxides.

OBJECTS OF THE INVENTION

It is a primary object of the present invention to provide mixtures of polyether epoxide/H₃PO₄ reaction products with other epoxide/H₃PO₄ products which advantageously effect the properties of the polyether epoxide products, as such, as base-neutralized dispersions in water and as cured coatings formed therefrom.

A particular object is to provide such mixtures in which the other epoxide/acid products are perfectly compatible with and render rapidly heat-convertible the polyether epoxide component.

A further object is to provide for flexibility in preparing and formulating such mixtures as water-thinned resin systems.

An additional object is to provide property-modifying agents (for polyether epoxide/H₃PO₄ reaction products) which have high phosphate contents and thereby enhance, rather than diminish, fire retardancy.

Still other objects will be made apparent to those skilled in the art by the foregoing background discussion and the following additional disclosure herein.

SUMMARY OF THE INVENTION

The invention is a water-thinnable resin composition, a method of preparing it and coatings derived from it.

The composition of the invention is a mixture of base-neutralized reaction products of H₃PO₄ with polyether epoxides of foregoing formula (a) or (q) and any of various other types of mono- or polyfunctional epoxides.

The preferred method of the invention is to co-react the polyether ($E^1$) and other ($E^2$) epoxides with an orthophosphoric acid source material and to neutralize the resulting mixed product with a base, preferably a fugitive base. However, the invention also comprises the method of preparation in which separately prepared $E^1$ and $E^2$ reaction products with phosphoric acid are combined.

The coatings of the invention are those formed on various substrates (preferably metallic) from aqueous dispersions of the preceding compositions.

The preferred method of the invention is more precisely definable as the process for preparing water-thinnable, base-salified reaction products of orthophosphoric acid and polyether epoxides which comprises:
(I) reacting orthophosphoric acid with
   (1) a polyether epoxide resin $E^1$ consisting essentially of molecules, each of which is of the formula

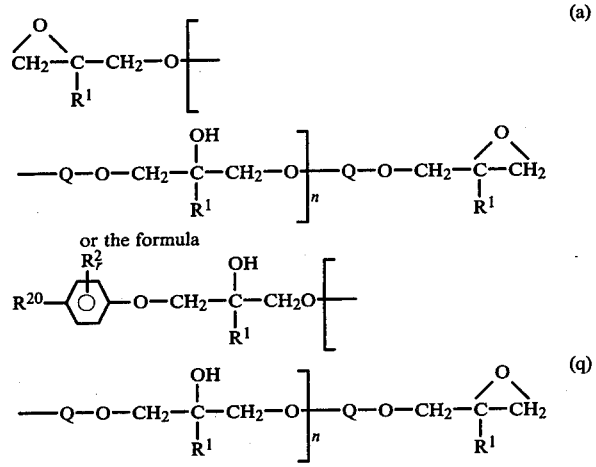

wherein Q, independently, in each occurence, is

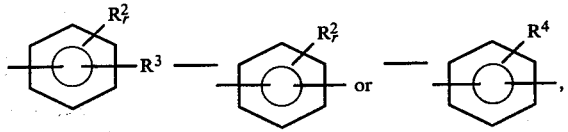

n is an integer of from 0 to 40, r is zero, 1 or 2 and, independently in each occurrence;
$R^1$ is H, methyl or ethyl,
$R^2$ is —Br, —Cl or a $C_1$ to $C_4$ alkyl or alkenyl group,
$R^3$ is a $C_1$-$C_4$ alkylene or alkenylene group, $>C(CF_3)_2$, —CO—, —$SO_2$—, —S—, —O— or a valence bond, and
$R^4$ is —Br, —Cl or a $C_1$ to $C_4$ alkyl or alkenyl group,
$R^{20}$ is H or alkyl of 1 to 12 carbons;
and
   (2) $E^2$, a vicinal epoxide, other than one of formula (a) or (q), which has an EEW (epoxide equivalent weight) within the range of from about 90 to about 2000 and is convertible to a water-dispersible material by reaction with orthophosphoric acid and neutralization with a base,
said reaction being carried out by contacting $E^1$ and $E^2$ with an orthophosphoric acid source material and from 0 to 25 molecular proportions of water per molecular proportion of $H_3PO_4$ provided by said source material until the fraction of the oxirane groups in $E^1$ and $E^2$ converted is at least sufficient to render the resulting mixed product water-thinnable when contacted with a base, the amount of orthophosphoric acid included as such in said source material, or obtainable therefrom by hydrolysis, being such as to provide at least 0.3 P—OH groups per oxirane group, and the mole ratio of $E^1$ to $E^2$ epoxides being from about 0.1 to about 100,
and
(II) contacting the resulting mixed reaction product with at least enough of a base to render it water-thinnable.

In one aspect, the composition of the invention is a resinous mixture, produced by the reaction of phosphoric acid and $E^1$ and $E^2$, as above defined, which is water-thinnable when neutralized with a base.

In another aspect, the composition of the invention is the water-thinnable product obtained by contacting said resinous mixture with a base.

Aqueous dispersions of the neutralized mixtures constitute a preferred embodiment of the composition of the invention.

The mixed, neutralized, epoxide/acid reaction products of the present invention may be more precisely defined as a water-thinnable, resinous phosphate composition comprising:
(A) resin molecules, each of which is deriveable by conversion to 1,2-glycol- or to beta-hydroxy phosphomonoester groups of the oxirane groups in an $E^1$ epoxide represented by one of the preceding formulas (a) and (q),
(B) other molecules, each of which is deriveable by conversion to 1,2-glycol- or to beta-hydroxy phosphomonoester groups of the oxirane groups in $E^2$, a vicinal epoxide other than those of formulas (a) and (q), having an EEW within the range of from about 90 to about 2,000, the mole ratio of said $E^1$-deriveable molecules to said $E^2$-deriveable molecules being within the range of from about 0.1 to about 100, and the number ratio of glycol to monoester groups in each of said types of molecules being within the range of from zero to about 18;
(C) from 0 to about 85 parts by weight of ortho phosphoric acid ($H_3PO_4$) per 100 parts by weight of said $E^1$- and $E^2$-deriveable molecules,
and
(D) one or more bases, in such amount that at least enough of the P—OH moieties in said $E^1$ and $E^2$-deriveable molecules are salified thereby to render them dispersible together in water.

In a preferred type of the preceding composition, those molecules not deriveable from epoxides of formula (a) or (q) are deriveable from $E^2$ epoxides, as above defined, which comprise benzene rings substituted with methylol or lower alkoxymethyl groups (i.e., R—O—$CH_2$—groups in which R is an alkyl group of 1 to 4 carbons or an alkenyl group of 2 to 4 carbons).

In another preferred type of the preceding composition, the molecules not deriveable from an $E^1$ epoxide are deriveable from an $E^2$ epoxide consisting of epoxy novolac molecules.

The base component of the above defined compositions preferably is of fugitive character.

As employed herein, the term "water-thinnable" means that the product so designated forms an essentially homogeneous solution or dispersion, upon being diluted with a substantial proportion of water, and the resulting dispersed product does not "settle out" or otherwise detrimentally alter at such a high rate that the dispersion is impracticable for use as a coating.

The mixtures which constitute the composition may be formed in either of two ways. The $E^1$ and $E^2$ epoxides may be co-reacted with a phosphoric acid source material or the products obtained by separately reacting the epoxides may be mixed (before or after neutralization with the same or different bases).

The latter mode of preparing the compositions is considered as another (process) aspect or embodiment of the present invention. That is, the invention also comprises combining separately formed $E^1/H_3PO_4$ and $E^2/H_3PO_4$ reaction products and sufficient base to render the combination dispersible in water.

DETAILED DESCRIPTION OF THE INVENTION

The reaction of $E^1$ type epoxides with phosphoric acid source materials and the resulting resinous compositions are fully discussed in the companion application referred to earlier herein. However, suitable phosphoric acid source materials and the effects of the several reaction parameters on the character of the $E^1$/acid reaction products are summarized subsequently herein.

The reaction is usually carried out by dissolving the $E^1$ epoxide(s) in the medium (when such is employed), adding the acid source material and such water as may be required to utilize that material or to give the desired product composition, and refluxing the mixture at a preselected temperature (and pressure) until the desired degree of oxirane conversion has been attained. The reaction mixture is cooled, neutralized with the base selected, diluted with water (often in an amount equal to the weight of solids present) and stripped.

Phosphoric acid source materials which may be employed in the $E^1$-acid reaction include 100% orthophosphoric acid, the semihydrate $2H_3PO_4.H_2O$ and aqueous solutions containing at least about 18 wt. % $H_3PO_4$ (~1 mole $H_3PO_4$ per 25 moles of water). The various condensed forms (polymeric, partial anhydrides) of phosphoric acid, e.g., pyrophosphoric acid and triphosphoric acid may also be used.

When the acid source material is of the condensed type, sufficient water should be supplied, at some stage prior to curing the resinous end-product, to ensure that no substantial proportion of P—O—P links are left in the cured resin.

Ordinarily, aqueous phosphoric acid solutions, particularly about 70–90% solutions, will be preferred. When a condensed form of phosphoric acid is utilized as the source material, the stage in the process at which P—O—P hydrolysis is effected will depend on whether or not minimization of water content during the reaction is desired. If a condensed source material is to be fully utilized as $H_3PO_4$ in the reaction, sufficient time should be allowed for complete P—O—P hydrolysis to occur.

The epoxide/acid reaction can be carried out with the neat reactants but it is preferred to employ an effectively inert reaction medium. Exemplary of solvents which are suitable for this purpose, in order of decreasing preference, are the following:

(1) mixtures of acetone with methylene chloride comprising 25 or less weight percent of the latter solvent, (2) ketones such as acetone and methyl ethyl ketone, (3) cyclic ethers such as dioxane, (4) linear ethers, such as glycol ethers, (5) esters, such as lower alkyl acetates, (6) mixtures of lower alcohols and chlorocarbons such as methylene chloride, (7) lower alcohols, and (8) chlorocarbons, such as methylene chloride.

The parameters which predominantly determine the water-thinnability of the (neutralized) $E^1$/acid reaction product are the EEW of the $E^1$ epoxide, the P—OH to oxirane ratio, the water to P—OH ($H_3PO_4$) ratio, the solubility of water in the reaction medium, temperature and contact time.

To be water-thinnable, when neutralized, the reaction product must have at least a minimal content of phosphomonoester groups and this imposes an upper limit of about 5500 on the EEW of the $E^1$ epoxide and a lower limit of about 0.3 on the ratio of P—OH groups (provided by the acid source material) to oxirane groups. It is also essential to water-thinnability that the ratio of glycol groups (from adduction of water with oxirane groups or hydrolysis of phosphodiester groups) to phosphomonoester groups is not higher than about 18 to 1. This in turn requires that the mole ratio of water to $H_3PO_4$ in the reactants is not higher than about 25 to 1.

The extent to which water enters into the reaction depends not only on the water to acid ratio but also on the activity of the water, which in turn depends both on the nature of the reaction solvent and the temperature. As a general rule, the activity of the water will be lower in poor solvents for water and at lower temperatures.

Adduction of P—OH with oxirane groups appears to proceed fairly rapidly in less polar solvents and, in such solvents, formation of $\beta,\beta'$-dihydroxy phosphodiester groups

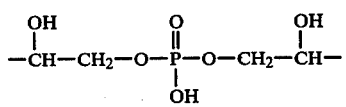

occurs to a substantial extent, at least in the early stages of the reaction. If water is absent or has a low activity in the solvent, the oxiranes may be predominantly converted to such diester groups and the $E^1$ molecules may be linked together by the diester groups to such an extent that gelling results.

The diester groups are readily hydrolyzed (to "glycol" and monoester groups) and therefore generally do not constitute an important component of the final products derived from reaction mixtures in which the activity of water is substantial. Furthermore, in the more polar solvents, acid-catalyzed adduction of water with oxirane groups appears to compete quite effectively with P—OH adduction.

Both adduction and hydrolysis reactions of course proceed more rapidly at higher temperatures and shorter contact times are accordingly required to attain a desired degree of oxirane conversion or to reach an equilibrium condition. If the activity of the water present is markedly higher at a more elevated temperature, the proportion of "glycol" groups in the product may increase accordingly.

As a consequent of oxirane conversion directly to glycol groups, free $H_3PO_4$ will generally be present in the reaction product, even when the P—OH to oxirane ratio in the reactants was substantially less than 1. However, the presence of the free acid (as a base salt) in the neutralized product does not ordinarily have a serious detrimental effect on the dispersibility of the product in water. Thus, a water dispersible product can be obtained in some cases even when the amount of the acid source material employed in the reaction is so high that as much as 85 parts by weight of $H_3PO_4$ per 100 parts of the $E^1$ derived resin molecules will be present in the product. However, such high acid contents result in poor hydrolytic stability in the cured coating. Of course, high acid contents can be lowered to tolerable levels by extraction, preferably before the product is neutralized.

The water-thinnability of the $E^1$/acid product has been found sensitive to the nature of the solvent it is associated with when the neutralized and water-diluted reaction mixture is stripped. The reaction solvent best suited to formation of a product of a desired composition may not be the best medium from which to form the aqueous dispersion. However, the reaction mixture may be stripped before (or even after) neutralization and dilution with water and replaced by a more suitable solvent. Methyl ethyl ketone has been found advantageous for the latter purpose. Alternatively, by using acetone including a minor proportion of methylene chloride as the solvent, very good results are obtained both in the reaction and the dispersion steps.

Preferred reactant ratios and conditions for the $E^1$/acid reaction are as follows: acid source material, aqueous 70% to 90% $H_3PO_4$; amount of acid source material, such as to provide from about 0.8 to about 1.2 P—OH's per oxirane; reaction temperature, within the range of from about 110° to about 130° C.; and contact time, within the range of from about 3 to about 6 hours. Supra-atmospheric pressures, at least equal to the autogenous pressure of the reaction mixture, of course must be maintained at temperatures above the boiling point of the solvent at atmospheric pressure. (Temperatures of up to about 150° C. may be employed.)

the average value of n, in formula (a) or (q), is about 9 or more). Consequently, it may not always be necessary to stay within the various ratio limits set out above for the $E^1$/acid reaction and products, when using an $E^2$ epoxide alone. In general, however, the best dispersions, of $E^2$ products or of mixed $E^1$ and $E^2$ products, will be obtained by staying within those limits.

A co-pending Application, Ser. No. 753,766, filed Dec. 23, 1976, is directed to the preparation of (unneutralized) reaction products of pohsphoric acid with $E^2$-type epoxides which contain methylol or loweralkoxymethyl substituents. The disclosure of the latter Application is also incorporated herein by reference.

The base constituent of the neutralized, mixed $E^1$ and $E^2$ acid reaction products preferably consists of one or more fugitive bases. That is, those bases present are volatile and dissociate from the acid (free acid or phosphoester P—OH) groups upon heating the salified product to a temperature equal to or lower than the required cure temperature (but higher than the maximum kettle temperature attained during stripping). Ammonia and amines are exemplary of such fugitive bases. The preferred bases are amines, particularly those of the formula $NR_3$, wherein each R is H, methyl or ethyl, independently, except that not more than one R is H. The most preferred base is triethylamine.

To facilitate understanding of the further discussion of the present process invention that follows herein, the natures of the $E^1$ and $E^2$ epoxides employed will first be disclosed in greater detail.

Suitable $E^1$ epoxides for the practice of the present invention are defined by formulas (a) and (q) earlier herein. Preferred among such epoxides are those in which Q, in all occurrences, is

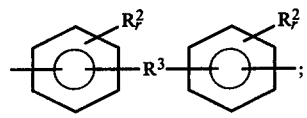

i.e., $E^1$ is preferably a nominally difunctional epoxide of the formula

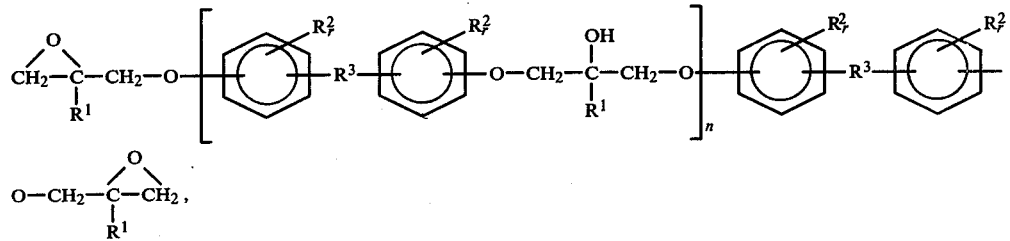

The foregoing summary is generally applicable to the reaction of $E^2$ epoxides with phosphoric acid source materials to form products which will be water-thinnable when neutralized. It is also generally applicable to co-reactions of $E^1$ and $E^2$ epoxides with $H_3PO_4$ (etc.). However, it is desirable to employ lower reaction temperatures (and/or to moderate the reaction in other ways) when the epoxide ($E^2$ or $E^1$) tends to readily polymerize and/or is substituted with such inherently reactive functions as methylol- or lower alkoxymethyl groups.

It may also be noted that most of the $E^2$-type epoxides which will be used have substantially lower EEW's than the most important $E^1$ epoxides (those for which or a nominally monofunctional monoepoxide derivable therefrom by 1:1 adduction with a phenol of the formula

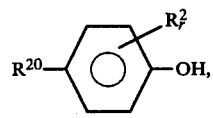

wherein $R^2$, r and $R^{20}$ are as above defined.

Particularly preferred are $E^1$ epoxides of the foregoing formulas in which Q, in essentially all occurrences, is either

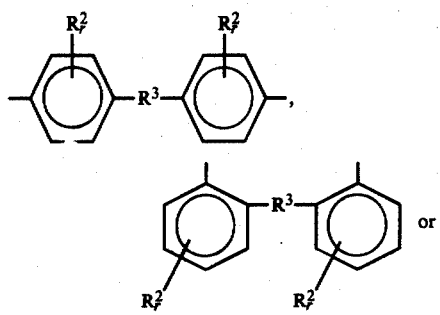

or

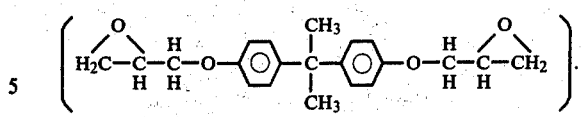

The diglycidyl ether may be preformed by reacting two molecules of epichlorohydrin with one molecule of the bisphenol-A in the presence of a base, such as sodium hydroxide. Classically, however, the latter reaction is carried out in such a manner that the resulting di-ether molecules react in-situ with bisphenol molecules to produce the DGEBA resin.

In the latter case, the reaction product tends to be a mixture consisting predominantly of polymeric species of different molecular weights corresponding to different values of n in the following idealized formula:

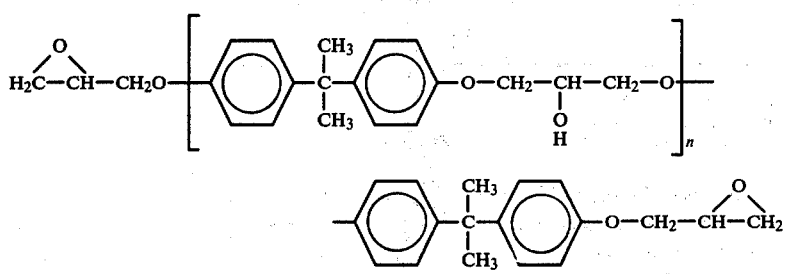

By reason of including some monofunctional epoxide species, such mixtures exhibit average epoxide functionalities of somewhat less than two.

The epoxide equivalent weights given subsequently in the examples herein for the preceding types of epoxides are generally somewhat higher than the theoretical values for the nominal compounds, for the reasons explained above.

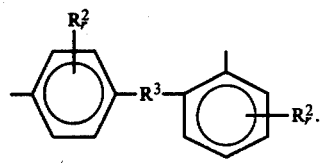

Most preferred are $E^1$ epoxides in which Q, in essentially all occurrences, is

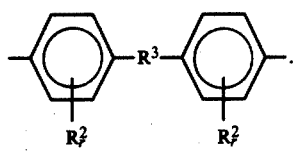

The individual epoxide of the foregoing type presently considered to be best for the practice of the invention is DER ®-667 (or equivalent DGEBA resins for which n (in formula (a)) is within the range of from about 10 to 13 (EEW from about 1500 to about 2000).

The most widely used resins of the foregoing type are DGEBA (diglycidyl ether/bis-phenol-A) resins, i.e., polyether diepoxides derivable from the polymeric adduction of bisphenol-A

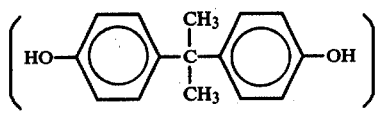

with the diglycidyl ether of of bisphenol-A

The practice of the present invention is not restricted to the use of one type of $E^1$ epoxide at a time or to such epoxides in which all $R^1$, $R^2$, $R^3$ or $R^{20}$ groups are the same throughout the molecule. Two or more distinct $E^1$ epoxides may be combined in a single reaction product with phosphoric acid. Similarly, a given $E^1$ epoxide may comprise as many different kinds of $R^1$ groups (H, —CH₃ or —C₂H₅), $R^2$ or $R^4$ groups (—Br, —Cl or —CH₃), $R^3$ groups ($C_1$-$C_4$ alkyl or alkylene, —SO₂— or —O—) or $R^{20}$ groups (H or $C_1$-$C_{12}$ alkyl) as it is synthetically feasible to incorporate in individual molecules of the formulas given in the foregoing broad definition of the invention.

Thus, for example, polyether diepoxides may be formed by using a mixture of epichlorohydrin and methylepichlorohydrin in place of either chlorohydrin alone, in well known methods of synthesis, such as are described in *Handbook of Epoxy Resins;* (ch 2) Lee and Neville; McGraw-Hill, (1967). Similarly, mixtures of different bis-phenols may be employed in well known procedures for reacting an individual bisphenol with an epichlorohydrin or with a diglycidyl ether of the same or a different bisphenol.

Few, if any, commercially available DGEBA-type resins are derived from bisphenols other than bisphenol-A (as such, or substituted with bromine or chlorine) or from chlorohydrins other than epichlorohydrin itself. That is, the commercially available DGEBA-type resins are those of the preceding general formula for $E^1$ in which $R^1$ is H, is either 0 or is 2 and $R^2$ is Br or Cl, and $R^3$ is $(CH_3)_2C<$. Exemplary of such commercial DGEBA resins, which are preferred for the practice of the present invention, are the following (manufactured by The Dow Chemical Company):

TABLE A

| Designation | Theoretical Value of n Corresponding to $M^3 = 2 \times EEW$ | $EEW^1$ | Viscosity; cps at 25° C. or (Duran m.p.) °C. |
|---|---|---|---|
| DER® -332 | 0 | 172–6 | 4000–5000 |
| -331 | 0 | 186–92 | 11000–14000 |
| -542[2] | 0 | 330–80 | (51°–61°) |
| -337 | ~0.5 | 230–50 | semi-solid |
| -660 | ~2 | 425–75 | (65–74) |
| -661 | 2–3 | 475–575 | (70–80) |
| -662 | 3–4 | 575–700 | (80–90) |
| -664 | 5–6 | 875–975 | (95–105) |
| -667 | 10–13 | 1600–2000 | (113–123) |
| -668 | 13–23 | 2000–3500 | (120–140) |
| -669 | 23–38 | 3500–5500 | (135–155) |

Notes:
[1] Epoxide Equivalent Wt.
[2] Prepared from tetrabromo-bisphenol-A
[3] Molecular Weight The epoxide functionality of DGEBA resins is generally less than the theoretical value of 2 and the actual values of n for the resins listed above would be lower than the theoretical values calculated for molecular weights equal to twice the EEW's given.

According to Lee & Neville (loc cit), a typical DGEBA resin having an EEW of about 190 (theoretical value of n=0) has been found to consist about 88% of molecules in which n=0, 10% of n=1 and 2% of n=2. Similarly, a typical higher molecular weight DGEBA resin, such as is used in some solution coatings and having an EEW of about 540 (theoretical value of n=2) was found to have the following compositions: >50% of n=3–5; about 15% of n=1, and 20% of n=4.

Exemplary bisphenols from which $E^1$ epoxides of the general formula (a) given earlier herein may be prepared, are as follows:

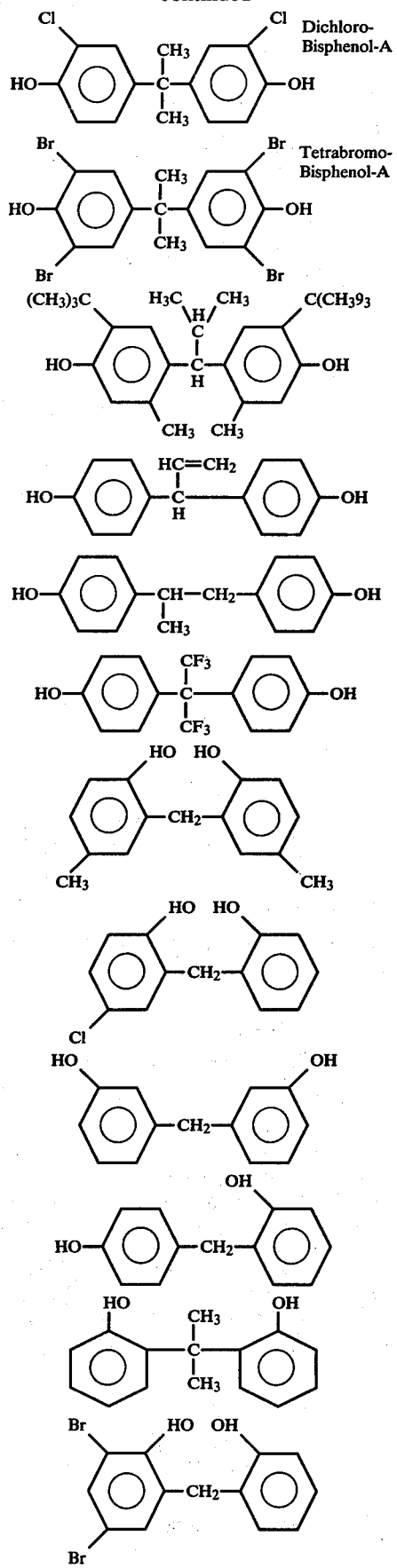

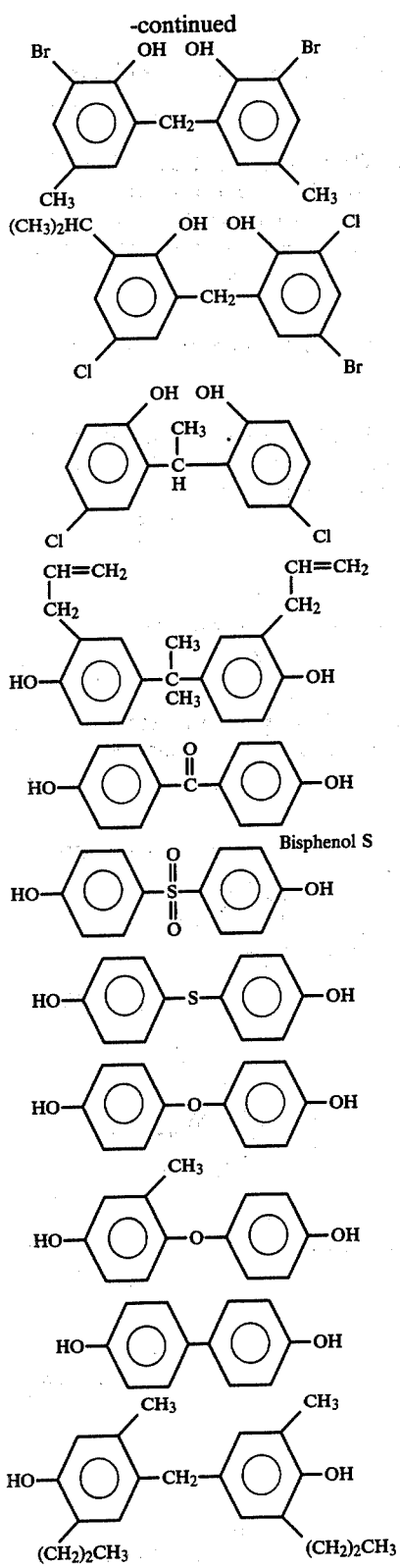

Additional exemplary bisphenols will be found in Tables I and II: *The Chemistry of Phenolic Resins;* R. W. Martin; pp. 64–79, Wiley & Sons; N.Y., N.Y., (1956).

$E^1$ epoxides of the type represented by formula (q) may readily be prepared by "capping" corresponding epoxides of formula (a), with one or more phenols

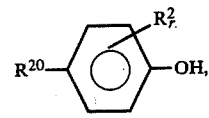

$R^2$, r and $R^{20}$ being as defined earlier herein, in a manner familiar to those skilled in the epoxy resin art. It has been found that the wetting ability of the resin can be varied in this manner to ensure better wetting on a given type of substrate.

It will of course be recognized that formula (q) will only be representative of the capped product as an "average" structure. That is, even if the phenol and type (a) epoxide are reacted in equimolar proportions, some of the product molecules will not be capped and others will have had both oxiranes reacted out. The epoxide and the phenol can be reacted in other than 1 to 1 ratio, so long as the EEW of the product is not raised above about 5500.

Suitable $E^2$ epoxides for the practice of the present invention are vicinal epoxides, other than those of the preceding formulas (a) and (q), which have EEW's within the range of from about 90 to about 2000 and are convertible to water-dispersible products by reaction with orthophosphoric acid, followed by neutralization with a base. Those skilled in the art, with the guidance afforded by these specifications, will be readily able to determine whether the latter criterion is met by any given candidate epoxide.

Representative kinds of $E^2$ epoxides are mono- to penta-functional epoxides of types (b) through (p), following:

(b) a methylol- or alkoxymethyl-substituted phenyl-glydicyl ether of the following formula

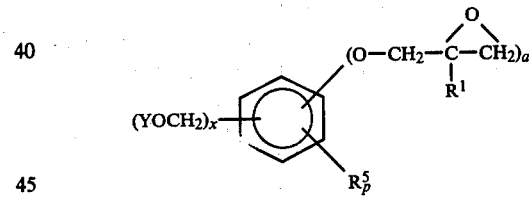

wherein
Y is H or a $C_1$ to $C_4$ alkyl or alkenyl group, each YO—$CH_2$— group is either ortho or para to a glycidyloxy group,
x is 1, 2 or 3, p is 0 or 1 and a is 1 or 2,
$R^1$, independently in each occurrence, is H, methyl or ethyl,
$R^5$ is a $C_1$-$C_{12}$ alkyl, alkenyl, cycloalkyl, phenyl, alkylphenyl, phenalkyl, phenoxy, —Br, —Cl group or a

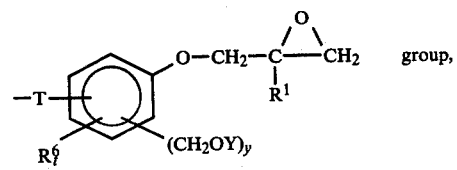

wherein
y is 0, 1 or 2
Y and $R^1$ are as above defined,

T is a $C_1$–$C_4$ alkylene or alkenylene group, >C(CF$_3$)$_2$, —SO$_2$—, —S—, —O— or a valence bond, R$^6$ is —Br, —Cl or a $C_1$–$C_{12}$ alkyl, alkenyl, cycloalkyl, phenyl, alkylphenyl, phenalkyl or phenoxy group, and t is 0 or 1;

with the proviso that (x+a) cannot exceed 4 and (x+y) is from 2 to 4;

(c) a methylol- or alkoxymethyl-substituted, (2,3-epoxy)propylbenzene of the formula

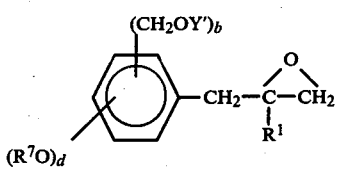

wherein:
b is 1 to 3, d is 0 or 1,
R$^7$ is $C_1$–$C_{12}$ alkyl or

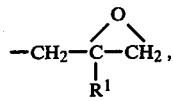

Y' is H or a $C_1$ to $C_4$ alkyl or alkenyl group,
R$^1$ is H, methyl or ethyl,
with the proviso that (b+d) cannot exceed 3;

(d) di- and trioxides of acyclic or cyclic, $C_4$ to $C_{28}$ hydrocarbons or esters containing two or three non-aromatic, carbon-to-carbon double bonds and, optionally, a —Br, —Cl or —F or hydroxy substituent;

(e) epoxy ethers of the formula R$^8$—O—R$^9$, wherein each of R$^8$ and R$^9$ is the same or a different monovalent radical deriveable by abstraction of hydrogen from a $C_3$–$C_{12}$ aliphatic-, alicyclic- or phenalkylene-oxide;

(f) 2,3-epoxypropyl halides, alcohols or esters of the formula

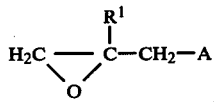

wherein A is —Cl, —Br, —OH or

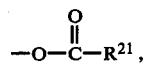

R$^1$ is —H, —CH$_3$ or —C$_2$H$_5$ and R$^{21}$ is a $C_1$–$C_{15}$ hydrocarbyl group;

(g) glycol monoethers of the formula

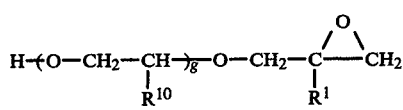

and glycol diethers of the formula

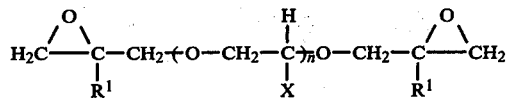

wherein, R$^1$ is —H, —CH$_3$ or —C$_2$H$_5$, R$^{10}$ is —H or —CH$_3$, X is —H, —CH$_3$ or —C$_2$H$_5$, g is 1, 2 or 3 and h is an integer of from 2 to about 10;

(h) diglycidyl ethers or esters of the formula

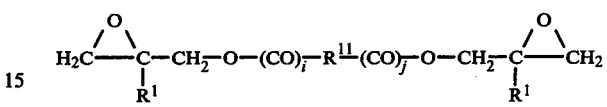

wherein R$^{11}$ is a divalent hydrocarbon radical of from 2 to 20 carbons, R$^1$ is —H, —CH$_3$ or —C$_2$H$_5$ and i and j independently are 0 or 1;

(i) mono or diglycidyl ethers of

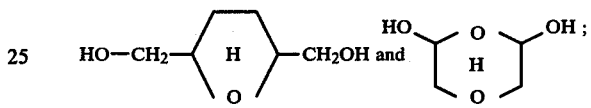

(j) mono-, di- or triglycidyl ethers of glycerine;
(k) trifunctional aromatic epoxides

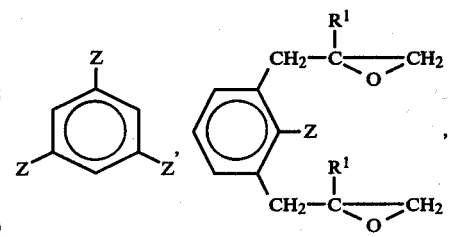

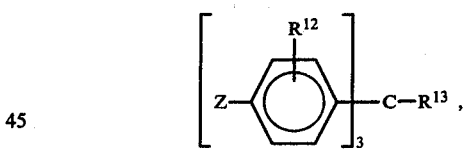

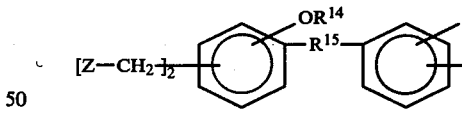

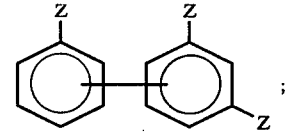

wherein Z is

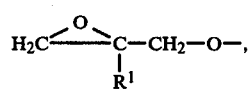

R$^{12}$ is $C_1$–$C_2$ alkoxy, $C_1$–$C_6$ alkyl or $C_2$–$C_6$ alkenyl R$^{13}$ is H, $C_1$–$C_{12}$ alkyl or $C_2$–$C_{12}$ alkenyl, R$^{14}$ is a $C_1$–$C_8$ alkyl, alkenyl, cycloalkyl, cycloalkenyl or aralkyl group, ortho or para to those Z—CH$_2$— moieties on the benzene ring to which said group is attached, R$^1$ is as previously defined and $R^{15}$ is a $C_1$–$C_4$ alkylene or alkenylene group or —$SO_2$—;

(l) tetraglycidyl ethers of the formula

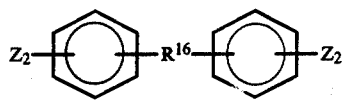

wherein $R^{16}$ is a $C_1$ to $C_6$, divalent aliphatic hydrocarbon radical,

>$C(CF_3)_2$, —$SO_2$—, —S—, —O— or a valence bond and Z is

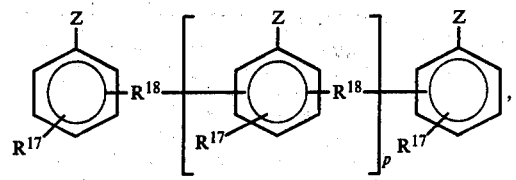

wherein p is 1 to 3, $R^{17}$ is H or —$CH_3$, independently in each occurrence, $R^{18}$ is an alkylene group of 1 to 4 carbons and Z is

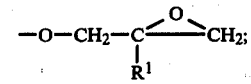

(n) methylol substituted, oligomeric monoepoxides of the formula

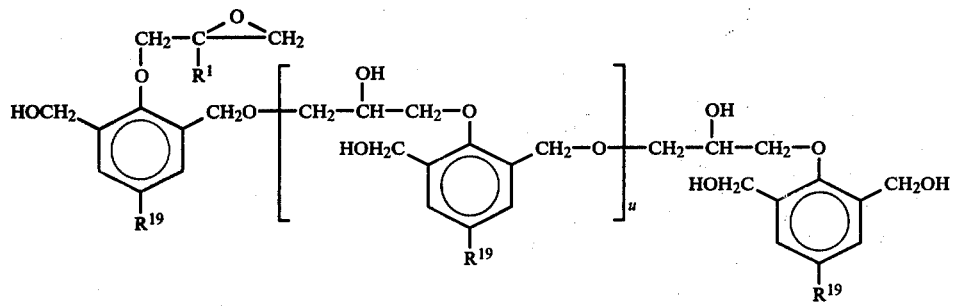

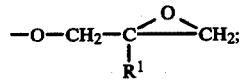

(m) tri- to pentafunctional epoxy novolaks of the formula wherein u is 0, 1, 2 or 3, $R^1$, independently in each occurrence, is H, methyl or ethyl and $R^{19}$, independently in each occurrence, is a $C_1$–$C_{12}$ alkyl, alkenyl, cycloalkyl, phenyl, phenalkyl or alkylphenyl group;

(o) epoxidized triglycerides of unsaturated fatty acids of up to 18 carbons each; and (p) one to one adducts of substituted phenols with diglycidyl ethers of substituted bis-phenols, of the formula

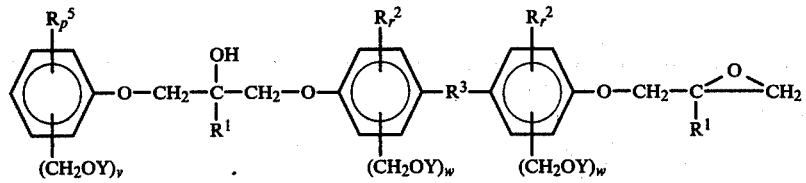

wherein $R^1$, $R^2$, $R^3$ and r are as defined in preceding formula (a), Y, $R^5$ and p are as above defined in formula (b), v is 1, 2 or 3 and w, independently in each occurrence, is 0, 1 or 2.

Exemplary, specific $E^2$ epoxides of types (d) through (m), and (o), are as follows:

| Type | Epoxide |
|---|---|
| (d) | Butadiene diepoxide, limonene dioxide, linalool dioxide, 4-vinylcyclohexene dioxide and trivinylbenzene trioxide. (See also Example 13.) |
| (e) | Diglycidyl ether, 4,4'-divinyldiphenylether dioxide, bis(2,3-epoxycyclopentyl)ether and the glycidyl ether of 3,4-epoxy-1-butanol. |
| (f) | Glycidol, epibromohydrin, 2-methyl epichlorohydrin, glycidyl benzoate and glycidyl methacrylate. |
| (g) | The monoglycidyl ether of ethylene glycol and the |

-continued

| Type | Epoxide |
|---|---|
| | bis(2-methylglycidyl)ether of tripropylene glycol. |
| (h) | Ethylene glycol diglycidyl ether, 2-butene-1,4-diol, diglycidyl ether; and the bis(2-ethylglycidyl)ether of 1,1-dimethylol-3-cyclohexene. |
| (i) | 2-glycidyloxymethyl-5-hydroxymethyl-tetrahydrofuran and the bis(2-methylglycidyl)ether of 2,6-dioxane diol. |
| (j) | 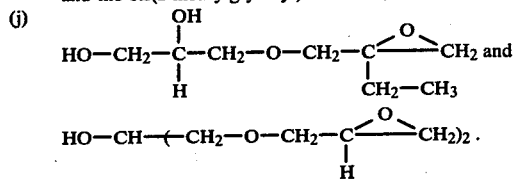 |
| (k) | 1,3,5-tris(glycidyloxy)benzene, 2,6-diglycidylphenyl glycidyl ether, tris(4-glycidyloxyphenyl)methane, 2,2',4'-tris(2-methylglycidyloxy)diphenyl, and 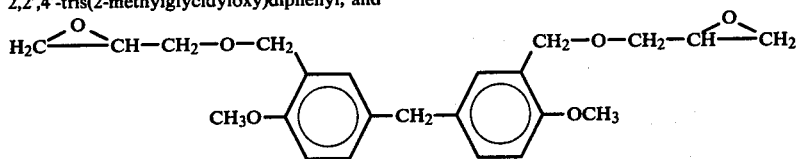 |
| (l) | 2,2',4,4'-tetrakis(glycidyloxy)diphenylmethane. |
| (m) | 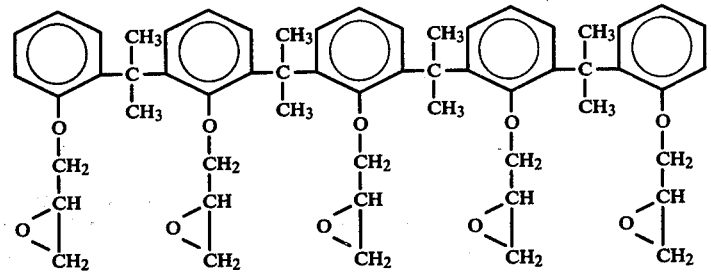 (The penta-glycidyl ether of the condensation product of 5 molecules of phenol with 4 molecules of acetone.) |
| (o) | Epoxide molecules of this type constitute the reactive components of epoxidized Soybean Oil. A commercial version of this material (FLEXOL®-EPO; Union Carbide Corp.) is an epoxidized mixture of triglycerides of $C_{14}$ to $C_{18}$ fatty acids. The proportions of saturated and unsaturated acids in the oil (prior to epoxidation) are as follows: |

| Fatty Acid | Formula | Wt. % | # of C=C |
|---|---|---|---|
| Myristic | $C_{14}H_{28}O_2$ | .1 | 0 |
| Palmitic | $C_{16}H_{32}O_2$ | 8.0 | 0 |
| Stearic | $C_{18}H_{36}O_2$ | 4.0 | 0 |
| Arachidic | $C_{20}H_{40}O_2$ | .6 | 0 |
| Myristoleic | $C_{14}H_{26}O_2$ | .1 | 1 |
| Palmitoleic | $C_{16}H_{30}O_2$ | .2 | 1 |
| Oleic | $C_{18}H_{34}O_2$ | 28.0 | 1 |
| Linoleic | $C_{18}H_{32}O_2$ | 54.0 | 2 |
| Linolenic | $C_{18}H_{30}O_2$ | 5.0 | 3 |

The theoretical EEW for epoxidation of all double bonds in the oil is about 210.

Types (b), (c), (d), (g), (m), (n), (o) and (p) are preferred among the above listed kinds of $E^2$ epoxides. Within the latter group, types (b), (c), (n) and (p) are particularly preferred by reason of containing methylol and loweralkoxymethyl substituents which render rapidly heat-converting those $E^1/E^2/H_3PO_4$ product mixtures comprising them.

Epoxides of types (d), (g), and (o) have been shown to improve film formation, dried film adherence and/or cured film flexibility. An epoxide of type (m) has been shown to improve film formation, cured film adhesion and solvent resistance (but to reduce cured film flexibility).

Most preferred $E^2$ epoxides are those of formula (b) in which Y is H or $-CH_3$, $x=z$, $p=1$, and $R^5$ is an aliphatic hydrocarbyl group of 1 to 12 carbons.

Exemplary epoxides of formula (b) which can be employed in the process of the invention are those methylol-substituted glycidyloxybenzene compounds derivable from the following known methylol-substituted phenols and bisphenols by known methods (see, for example, U.S. Pat. No. 3,859,255; columns 5-7):

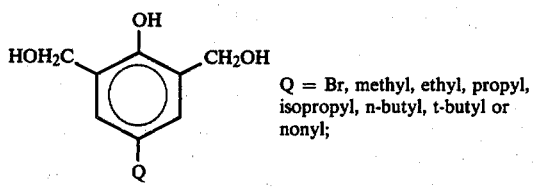

Q = Br, methyl, ethyl, propyl, isopropyl, n-butyl, t-butyl or nonyl;

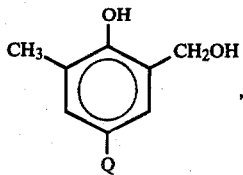

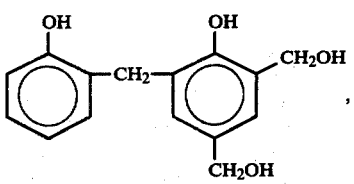

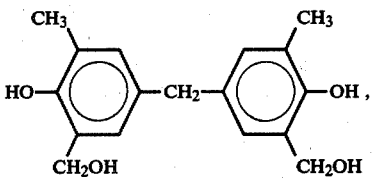

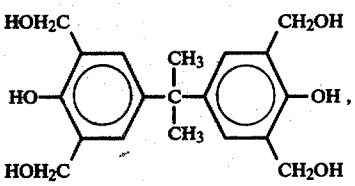

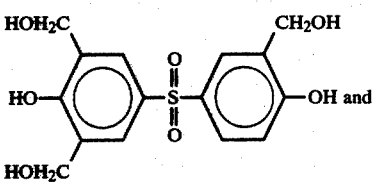

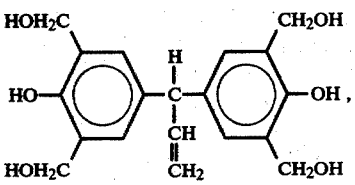

A specific, methylol-substituted, mononuclear diepoxide (of formuls (b)), disclosed in U.S. Pat. No. 3,925,315 is

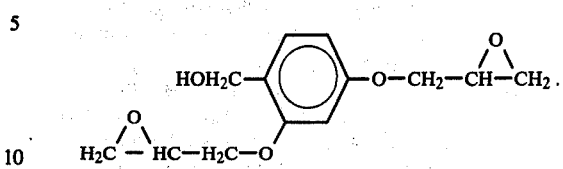

Specific dinuclear type (b) diepoxides are the following "APOGEN®" resins, available from Schaefer Chemicals, Inc., P. O. Box 132, Riverton, N.J.:

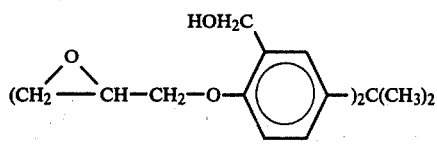

and

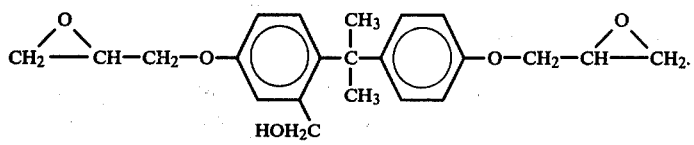

Mixed glycidyl ethers of mono-, di- and trimethylol phenol can be prepared by "epoxidation" of the corresponding mixture of allyl ethers, which is marketed as METHYLON® Resin 75108 by General Electric Company. (See U.S. Pat. No. 2,965,607 for an epoxidation procedure.) These mixed ethers are representative of type (b) mononuclear, monoepoxides substituted with from 1 to 3 methylol groups.

Exemplary $E^2$ epoxides of foregoing formula (c) are:

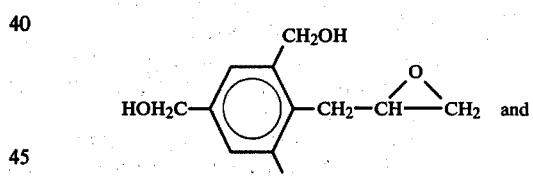 and

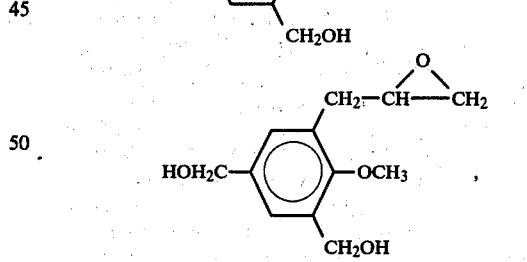

which can be made by the "epoxidation" procedure of Example XII, U.S. Pat. No. 2,965,607, from the respective precursor compounds, 1-allyl-2,4,6-trimethylolbenzene (U.S. Pat. No. 3,906,126) and 1-allyl-2-methoxy-3,5-dimethylolbenzene (U.S. Pat. No. 2,707,715).

Some or all of the methylol groups present in epoxypropyl benzene compounds of the preceding types, or in the glycidyl ethers derivable from any of the foregoing methylol-substituted phenols, can be converted to corresponding alkoxymethyl groups by well known methods commonly utilized in making benzyl ethers.

Epoxides of formula (n) may be regarded as oligomers of methylol-substituted phenyl glycidyl ethers.

They may be prepared simply by heating the latter ethers to a temperature (such as about 165° C.) at which the methylol groups interact with the oxirane groups at a reasonable rate and maintaining that temperature until the EEW of the resin has increased to a value commensurate with the desired value of u.

The specific oligomer in which (in formula (n)) the average value of u is about 1.5, $R^1$ is H and $R^{19}$ is t-butyl, has an EEW of about 940 and is obtained by heating the corresponding monomer for about 2.3 hours at 165° C.

Some or all of the residual methylol groups in such oligomers of course can be converted, by known methods, to alkoxymethyl groups to provide a variant type of $E^2$ epoxide.

Exemplary epoxides of formula (p) are:

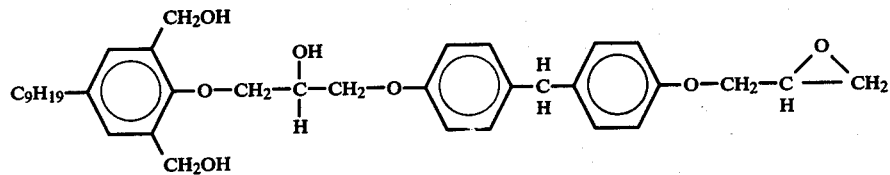

and

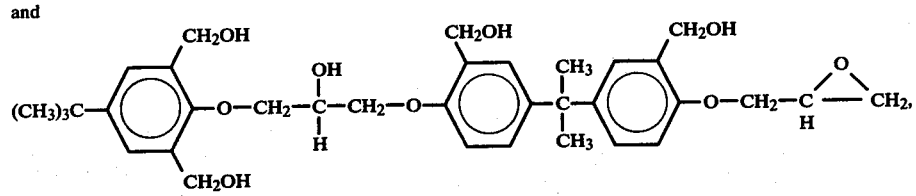

which can be prepared by reaction of the corresponding 4-alkyl-2,6-dimethylolphenols and diglycidyl ethers of Bis-A-type diphenols in the presence of a catalyst, such as ethyl, triphenyl phosphonium acetate, in a known manner.

The practice of the present invention is not restricted to the use of one species of $E^2$ epoxide at a time or to such epoxides in which all Y, $R^1$, $R^2$, $R^3$, $R^6$, Z (etc.) groups are the same throughout the molecule. Two or more distinct $E^2$ epoxides of any or all of preceding formulas (b) through (p) may be combined in a single reaction product with phosphoric acid. A given epoxide may comprise as many different kinds of the specified substituent groups as it is synthetically feasible to incorporate in individual molecules of the latter formulas.

When the mixtures of the present invention are to be made by co-reaction of a phosphoric acid source material with an $E^1$ and an $E^2$ epoxide, the reaction may be carried out in either of two ways. The $E^1$ and $E^2$ epoxides may be mixed and then contacted with the acid, or first one and then the other of the two types of epoxides may be "reacted in". It might be expected that the second mode of practice would result in the presence in the final product of molecules consisting of $E^1$ and $E^2$ residues joined by phosphodiester groups. However, this generally will only be the case if water is essentially excluded from the mixture and any free acid remaining after the first reaction has been removed before the second epoxide is added. Further, any such diester groups will tend to undergo hydrolysis whenever the product is contacted with water.

In general, it has been found preferable to react the acid with the $E^1$ and $E^2$ epoxides sequentially. When this is done, different reaction temperatures may be employed for the successive conversions of the two types of epoxides. As a rule, the $E^2$ epoxide will be the more reactive of the two and is best introduced after the $E^1$ epoxide has been at least partly converted.

PROCEDURE

The reactions of the epoxides with the orthophosphoric acid source materials (and such water as may be present) are readily carried out in conventional equipment.

The first step will normally consist of dissolving the epoxide or epoxides in the reaction medium (or in the component thereof which is the best solvent for the epoxide). In the case of the higher molecular weight ($E^1$) epoxides, at least, dissolution in most solvents is somewhat slow at ordinary temperatures and will usually require agitation of the resin/solvent mixture for a period of time such as about 8 hours or more.

The acid source material, usually 85% aq. $H_3PO_4$, may be pre-dissolved in or diluted with one or more components of the reaction medium, to facilitate mixing with the epoxide solution. In any case, it will usually be more convenient to run the acid material into the epoxide solution, rather than vice versa. Introduction of the reactants to each other gradually and/or at low temperatures is not necessary unless a highly reactive epoxide (more often the $E^2$ epoxide) is employed in the reaction. (An example of a highly reactive $E^1$ epoxide is the diglycidyl ether of bis-phenol-A.)

In the latter circumstance, it is desirable to operate initially at as low a temperature as will permit the reaction to proceed at a satisfactory rate. In this manner (and by dilution), reactions leading to gelling can be minimized. Thus, in simultaneous or sequential reactions, the reactants may be inter-mixed as thoroughly as possible, prior to onset of a given reaction, by prechilling, mixing and stirring the reactants (and medium) at a low temperature (<5° C., for example) for a period of up to a day or more. After this is done, the mixture should be allowed to warm slowly, to avoid any tendency for a sudden exotherm to occur. After the more reactive epoxides have been largely converted, i.e., after the oxirane content has decreased sufficiently, the mixture may be taken to a higher temperature, to drive the reaction(s) to completion more rapidly. However, temperatures substantially in excess of about 150° C. generally are to be avoided, during the reaction and also subsequently, as during solvent removal.

Ordinarily, the mixed reactants are heated, preferably with agitation, to the desired reaction temperature in a vessel suitably equipped with a reflux condenser, a pressure seal or such other apparatus as is appropriate. The vessel contents are kept at temperature at least until sufficient oxirane conversion has been attained to result in a water-thinnable product (upon base addition).

The reaction mixture is cooled and then "neutralized" as discussed below, diluted with water and stripped of lower boiling materials. If a reaction medium consisting of or comprising a solvent higher boiling than water has been used for the reaction, addition of water may be delayed until the high boiling solvent(s) have been replaced with a lower boiling solvent (which is then stripped off after the water is added).

It is generally desirable to add the water gradually, with good agitation, as otherwise coagulation of the salified (neutralized) resin may result.

Base Neutralization

The reaction product of $H_3PO_4$, $E^1$ and/or $E^2$ may be neutralized with any base of such nature that the neutralized product will be water thinnable. Depending on factors which will be apparent to those skilled in the art, complete neutralization is not necessarily required in all cases. That is, the acid/epoxide reaction product need be reacted with only as much base as is necessary to provide the proportion of salified ester P—OH groups required to achieve water-thinnability. However, provision of at least one equivalent of base per phohsphate ester group is generally preferable and will usually be essential when the acid number of the product resin is relatively low. At the other extreme, enough base may be provided to completely neutralize all acidic hydrogens present in the acid/epoxide reaction product (including any free $H_3PO_4$).

Exemplary types of bases suitable for the practice of the present invention are:

A. Alkali metal hydroxides, such as lithium, sodium and potassium hydroxides, etc. These bases may be employed with resins which are to be used (as surface active materials, for example) in the form of the uncured salts or in which the reactive functions present (secondary alcoholic hydroxyls) may be utilized to effect curing.

B. Oxides or hydroxides of alkaline earth metals, such as beryllium or calcium, which form phosphates or acid phosphates having measurable water solubilities. Again, curing of such salts will require the presence of the above-named reactive functions. The salts may also be utilized as water-dispersible sealers or primers on materials such as unfired ceramics which are subsequently to be fired.

C. Oxides or hydroxides of other metals, such as copper and iron, which form phosphates or acid phosphates having measurable water solubilities, as such or as hydrates, complexes with ammonia, etc.

D. Ammonia or ammonium hydroxide.

E. Organic bases. This class of bases is highly preferred and includes the following types of compounds:
 a. choline and guanidine;
 b. aliphatic mono- and polyfunctional amines, such as methyl amine, n-butyl amine, diethyl amine, trimethyl amine, diethylenetriamine, n-hexylamine, ethylene diamine, allyl amine, etc.;
 c. cycloaliphatic amines, such as cyclohexyl amine, cycloheptyl amine, etc.;
 d. aromatic amines, such as aniline, N,N-dimethyl aniline, diaminobenzenes, etc.;
 e. heterocyclic amines, such as ethylenimine, piperazine, morpholine, pyrrolidine, pyridine, hexamethylenimine, etc.; and
 f. alkanolamines and alkylalkanol amines, such as ethanolamine, dimethylaminoethanol, diethylaminoethanol, diisopropanolamine, triisopropanolamine, 4-hydroxy-n-butylamine, 2-dimethylamino, 2-methyl, 1-propanol, etc.

Among each of the preceding classes a-f, those compounds which can be removed from the neutralized resin dispersions, during or after water boil-off, by heating to temperatures less than those required to attain satisfactory cure rates, are preferred. Particularly preferred are those organic bases of classes b and f which can be removed by heating to temperatures below about 150° C. This will generally be feasible with such bases having boiling points of less than 150° C. at a pressure of 760 mm Hg.

Among the latter bases, the most preferred are amines of the formula $NR_3$, wherein each R is H, methyl or ethyl independently, except that not more than one R is H. In order to decreasing preference, according to such factors as curing time (including the time required to effect de-neutralization and amine removal) and the viscosity and ease of stripping of the neutralized reaction mixture, highly preferred specific such amines are triethylamine, dimethylamine, trimethylamine and diethylamine. Triethylamine is particularly preferred, not only with regard to the preceding factors but also because such amounts of it as remain in the cured coatings have been found not to be readily leached out by water, even at such elevated temperatures as are encountered in processing of canned foods.

Next most preferred are alkanolamines of the formula $R_2'N—CH_2—CH_2—OH$, wherein one R' is H, methyl or ethyl and the other, independently, is H, ethyl or 2-hydroxyethyl. In order of decreasing preference, those specific alkanol amines which are more highly preferred are N,N-dimethylethanolamine, N-methylethanolamine, ethanolamine and diethanolamine.

Triethanolamine is apparently not suitable for the neutralization of higher molecular weight acid/$E^1$ epoxide reaction products of the invention. DER ®-667/$H_3PO_4$ reaction mixtures neutralized with triethanolamine, diluted with water and stripped (to a solids content of about 50%) have not yielded dispersions. However, triethanolamine does not cause any problems when included with CYMEL ®303 (hexamethoxy methyl melamine) in coating formulations of the dispersions of the present invention.

It has also been observed that higher molecular weight $E^1$/acid products neutralized with dimethylaminomethylpropanol,

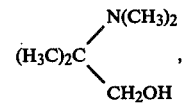

disperse well only if the amount of $H_3PO_4$ employed in the acid/epoxide reaction is greater than about 1 part per hundred parts of the resin (DER ®-667).

Mixtures of any of the foregoing amines and alkanolamines may of course be employed for particular applications where they are of advantage. Similarly, separately prepared $E^1$ and $E^2$ reaction products with $H_3PO_4$ may be neutralized with different bases and then combined, or may be combined first and neutralized with the same base material.

Neutralization is usually carried out by diluting the acid/epoxide reaction mixture (including the solvent used) with enough water to give a dispersion which is satisfactorily easy to stir, and then adding the base (or vice versa). When no acid has been removed from the epoxide/acid reaction mixture, a very convenient method is simply to add 2 equivalents of base (2 moles of an amine, for example) for each mole of $H_3PO_4$ (100%) charged to the reaction. However, the amount of base required may be measured out according to a predetermined acid content in the material to be neutralized. Alternatively, litmus or pH paper or a pH meter may be used to determine when to stop adding base. Another option which may be satisfactory in routine operation is simply to add the base, in increments and with good stirring, until the appearance or behavior of the stirring dispersion markedly alters in a way known to correspond to attainment of the desired degree of neutralization. In general, however, a definite pH, within the range of from about 6 to about 10, (preferably about 6.5 to about 9) will be preselected as the end-point for the neutralization. Since the rate of the neutralization will drop off as the number of unneutralized, acidic hydroxyls present decreases, sufficient time should be allowed after each base addition to ensure that any apparent end-point is in fact a true end-point. Ordinarily, no pH drift should be observable after about an hour.

Water-thinning and Utilization of the Neutralized $H_3PO_4$/epoxide Reaction Product Unless the neutralized product is to be used without being shipped, as little water as possible will ordinarily be used in preparing it, so that shipping costs will be held down. However, prior to application to a substrate to be coated, the neutralized (and stripped) material will usually be thinned with additional water to a consistency dependent on the amount of additives or curing agents which must be co-dissolved, the mode of application contemplated, the viscosity desired, the thickness of the coating to be formed, and so on. (It is generally preferred to prepare the aqueous product dispersions at a level of 50% solids and no difficulty has been experienced in further thinning such dispersions with water.) Energy requirements for water evaporation are of course another consideration. Ordinarily, the water employed as a thinner will be added at a relatively low rate, with good stirring, so as to avoid any tendency to form a quasi-stable mixture of two discrete liquid phases. However, in some cases, reverse or even "all at once" addition may be permissible.

Stripping of the neutralized mixture is carried out in a generally conventional manner at a pressure appropriate to the normal boiling point of the solvent(s) to be removed. Care should be taken to avoid excessive kettle temperatures during stripping so that undesired hydrolysis of ester groups does occur. Undesirably high kettle temperatures are most likely to occur during the latter stages of stripping, particularly when a relatively high boiling, water miscible solvent has been used in or as the reaction medium. In the latter situation, a relatively low stripping rate or some other expedient, such as addition of a solvent which forms a lower boiling azeotrope with the water-miscible solvent, should be resorted to.

In an alternative mode of utilization, the neutralized reaction product may be converted, as by spray-drying, for example, to a powder which can subsequently be dissolved in water or applied directly to substrates by known powder-coating techniques.

Aqueous solutions of the neutralized reaction products can be applied to various substrates to be coated, by such known techniques as spray coating, dipping, roller coating, brushing or by use of draw bars. Removal of the water from the resultant aqueous films is readily accomplished by known methods, such as passing an air stream of controlled temperature and moisture content over the film at a controlled rate, passing the film through a zone of reduced pressure, heating, etc. When the salt moieties present in the neutralized reaction product (resin) are of such a nature as to be readily decomposed by heating and the base evolved upon decomposition is volatile, all or at least a substantial portion of the base may be removed during the water-removal operation.

Any base remaining after water removal may be essentially removed by further heating, under ordinary or reduced pressure. The removed base ordinarily will be recovered, as by condensation or by acid scrubbing.

As indicated earlier herein, curing of the resin after water and base removal may be accomplished by means of any suitable agency. If an auxiliary chemical curing agent is to be employed, the agent may be introduced prior to water removal or subsquently (as by being sprayed as a solution in a volatile solvent on the uncured film). In general, the most convenient and economical method of curing will be simply by application of heat, as by baking, to effect cross-linking reactions between the reactive functional groups in the deneutralized coating, such as secondary hydroxyls, P—OH groups and any groups reactive therewith, in added curing agents, such as ureas, melamines and phenolics.

Methods of Characterizing Products

1. Titration of acids

The relative amounts of the phosphoric acid charged to the reaction which report in the product mixture as the free acid, as monoester groups and as diester groups may be determined as follows. A sufficient sample of the reaction mixture to provide about 1 millequivalent (meq) of solids (based on acid present) is dissolved in 35 ml. of a solvent consisting of 66.7 wt.% 2-butanone, 16.65% methanol and 16.65% water. The solution is titrated with about 0.3 N methanolic tetrabutylammonium hydroxide, using a Metrohm/Herisan automatic titrimeter, to a second break (inflection) in the resulting conductivity vs. titrant-volume curve. 10 ml. of water and 10 ml. of 10% aq. $CaCl_2$ are added and allowed to react for about 10 minutes, thereby converting all phosphomono- and diester groups to neutral calcium salt groups. The free phosphoric acid is converted to the monoacidic phosphate, $CaHPO_4$. All of the calcium-containing products precipitate but a third break on the titration curve can now be observed, without interference from the second monoester proton, upon neutralization of the proton in the $CaHPO_4$ with more of the quaternary hydroxide base. The amount of base required to produce the first break is that consumed by the sole acidic proton in the diester and by the first protons in the monoester groups and the free acid. The additional amount of base required to reach the second break is that consumed by the second (last) proton in the monoester groups and by the second proton in the free acid. The additional amount of base to reach the last break is consumed solely by the last proton in the calcium salt derived from the free acid. If the total volumes of base solution required to reach the successive breaks are denoted as $v_1$, $v_2$ and $v_3$, the relative amounts of phosphate present as mono- and diester groups and as the free acid may be calculated from the following relationships:

Free $H_3PO_4 = v_3 - v_2$

Monoester $= 2v_2 - v_1 - v_3$

Diester $= 2v_1 - v_2$.

The proportion of the consumed epoxide groups reporting in the product as glycol groups (as a consequence of hydrolysis reactions) is calculable from the following relationship (assuming the only conversion products are glycol, monoester or diester groups):

$$\%e_g = 100 - \frac{M_A}{e_o - e_p}(\%m + 2(\%d)) \quad (1)$$

wherein $e_p$ = equiv. epoxide present in product as such (usually zero)
$e_o$ = equiv. of epoxide charged to reaction
$e_g$ = equiv. epoxide converted to glycol groups
$M_A$ = moles $H_3PO_4$ charged to reaction
%m = mole % charged acid reporting as monoester
%d = mole % charged acid reporting as diester 2. Titration of oxirane groups The standard method of analysis, using a 25% solution of tetramethyl ammonium bromide in glacial HOAc and back-titrating against crystal violet with 0.1N solution of perchloric acid in glacial AcOH, was found to be suitable and was employed in all determinations of oxirane contents given in the following examples.

3. Viscosity measurements

As an indicator of crosslinking and/or molecular weight changes, the viscosities of some of the reaction mixtures described in the Examples herein were measured by the well known Gardner method.

EXAMPLES

The following examples are for purposes of illustration and are not to be construed as limiting the scope of the invention, which is to be determined only by the claims appended with this specification.

In several of the experiments described in the following examples, the reaction mixtures were allowed to reflux overnight, or longer, in order to ensure as complete esterification as possible. However, the reactions are believed to have been essentially complete well before refluxing was terminated.

EXAMPLE 1

Simultaneous co-reaction of $H_3PO_4$ with a DGEBA-type $E^1$ epoxide and an aromatic $E^2$ monoepoxide containing no methylol or methoxymethyl groups. ($\overline{EEW}=600$; 1.29 P—OH/oxirane.):

350 grams (~0.1 g moles) of DER ®-667 and 75 grams (0.5 g moles) of phenyl glycidyl ether, in 500 grams of methylene chloride, were reacted 3.5 hours with 35 grams of 85% $H_3PO_4$ at 21°-34.5° C. until the oxirane content was less than 0.1%. 500 grams of distilled water were added and then the mixture was neutralized, to a pH of about 8, with 55 grams of triethylamine. After the solvent was stripped off, the residual dispersion had a low viscosity and was readily water thinnable. Some settling occurred on prolonged standing. Coatings (20% non-volatile) on untreated aluminum test strips gave full cures in 10 minutes at 375° F. and the cured films passed 50 double rubs with acetone. However, some blushing was observed after 30 minutes immersion in boiling water.

EXAMPLE 2

Sequential co-reaction of $H_3PO_4$ with DER ®-667 and a phenylglydicyl ether substituted with methylol groups (type (b) $E^2$ epoxide) ($\overline{EEW}=720$; 0.935 P—OH/oxirane):

70 lbs. (~0.02 lb. moles) of DER ®-667 was dissolved in 100 lbs. of methylene chloride and 20 lbs. of IPA, warmed to reflux in 2 hours, and reacted 24 hours at 41° with 5.0 lbs. of 85% $H_3PO_4$. The oxirane content, on a solids basis, was less than 0.1%. 30 lbs. (~0.1 lb. moles) of the glycidyl ether of 1,6-bis(methylol)-4-t-butylphenol was then reacted in at 41° C. for 33 hours. The oxirane content again was less than 0.1%; acid number 14.5. 175 lbs. of distilled water, and then 80 lbs. of triethylamine, were stirred in. After the solvents were stripped off, the residual dispersion had a pH of 8.5 and displayed excellent stability and solution characteristics, i.e., no settling, low opacity and no grain. Coatings were applied on aluminum test strips at a non-volatiles level of 20 wt.%, in water, using a #10 wire-wound rod and with no pretreatment of the test strip surfaces. Good wetting, excellent flow and full cure in 8 minutes at 380° F. or 5 minutes at 400° F. or 3 minutes at 440° F. were obtained. The chemical resistance of the films was excellent; usually, 50 acetone double rubs were passed. Excellent wetting was also observed on tin-free steel coupons. No blushing of coatings on either type of surface was observed after 30 minutes immersion in boiling water. The preceding cure times were cut in half when 1% p-toluenesulfonic acid (solids basis) was included in the water-thinned dispersion, with no loss of film properties.

EXAMPLE 3

One step co-reaction of DER ®-667 and a type (b) $E^2$ monoepoxide containing methoxymethyl functionality; ($\overline{EEW}=720$; 1.32 P—OH/oxirane.)

2270 grams (0.65 moles) of DER ®-667 and 973 grams (3.31 moles) of the glycidyl ether of 1,6-(bis-(methoxymethyl))-4-t-butylphenol were dissolved in 908 grams of methylene chloride and reacted at 41° C. for 16 hours with 227 grams of 85% $H_3PO_4$. Some viscosity build-up was observed during the reaction and another 454 grams of methylene chloride was added to keep the mixture stirrable. After the oxirane content had decreased to less than 0.1%, 3242 grams of distilled water, and then 292 grams of triethylamine, were stirred in. The properties of the stripped dispersion were as in the preceding example. Coatings applied as above on untreated aluminum test strips, at a non-volatiles level of 26 wt.% in water, showed excellent wetting, film flow and full cure in 30 minutes at 310° F. or 10 minutes at 356° F. Chemical and boiling water resistances were excellent.

EXAMPLES 4–7

Effects on viscosity, cure rates and film properties of neutralizing sequential co-reaction product with different amines.

A master batch of acid/$E^1$/$E^2$ product was made up in a two-step esterification essentially as in Example 2. ($\overline{EEW}$ of $E^1 + E^2 = 720$; 1.32 P—OH/oxirane.) In the first step, 700 grams (0.2 g. moles) of DER®-667, in 1000 grams of methylene chloride and 200 grams of IPA, was warmed to reflux in 2½ hours and reacted with 70 grams of 85% $H_3PO_4$ for 41 hours at 41° C., acid number 95; oxirane content less than 0.2%. In the second step, 300 grams (1.13 g moles) of the glycidyl ether of 1,6-bis-methylol-4-t-butylphenol was reacted in at 41° for 16.5 hours. The oxirane content was less than 0.1 wt.%; acid number 70. 2150 grams of distilled water was stirred in and the resulting, homogeneous dispersion was split into four equal portions.

EXAMPLE 4

To 1000 grams of acidic product dispersion was added 27 grams of trimethylamine. After stripping, the pH was 7.4. Coatings prepared and tested as were the coatings of Example 2 were essentially identical in character thereto.

EXAMPLE 5

To 1000 grams of dispersion were added 34 grams of a 50:50 blend (by weight) of triethylamine and dimethylaminoethanol; pH=9, before stripping. The resulting mixture was a highly viscous gel which, however, could be stripped of solvent easily. The stripped dispersion was not highly viscous and gave coatings, at the same level of non-volatiles, which differed from the coatings of Example 4 as follows: cure at 400° F. required 3 minutes, rather than 5; the coatings had less tendency to dry out before being cured; no difference in the effect on cure rate of 1% p-toluene sulfonic acid and the viscosity of the water-thinned dispersion was higher.

EXAMPLE 6

To 1000 grams of dispersion, 40 grams of dimethylaminoethanol was added. A highly viscous but readily stripped gel resulted. The residual dispersion was diluted with water to a 20% content of solids. Coatings prepared as were the coatings of Example 4 differed in the following respects: slower cure (5 minutes at 400° F., instead of 3 minutes); acetone resistance somewhat inferior; almost no tendency to dry out before cure; much higher viscosity and 1% p-toluenesulfonic acid was less effective in accelerating curing.

EXAMPLE 7

To 1000 grams of dispersion, 35.5 grams of diethylaminoethanol was added. A highly viscous but readily stripped gel resulted. After stripping, the residual dispersion was still quite viscous and was therefore diluted to 15% solids (rather than 20%) with water. The differences observed between coatings prepared from the resultant solution and the coatings of Example 4 were as follows: much higher solution viscosity; no tendency to dry out before curing; slower curing (7 minutes at 400° F. instead of 5 minutes) and no improvement in effect of p-toluenesulfonic acid (1%) on cure rate.

Comparison of Examples 2 and 4 show that trimethyl and triethyl amines were generally equivalent for neutralization of the co-reaction product. Similarly, no substantial difference is seen (Examples 6 and 7) between N,N-dimethylethanolamine and the N,N-diethyl homolog thereof. Comparison of Example 2 (or 4) and 5 shows that a 1:1 mixture of triethylamine and N,N-dimethylethanolamine gives a faster uncatalyzed cure rate, a higher dispersion viscosity and a reduced tendency for the uncured film to dry out. However, it is apparent from Examples 6 and 7 that the use of either of N,N-dimethyl- and N,N-diethyl ethanolamine gives generally poorer results, except for a further decrease in dry-out tendency.

EXAMPLE 8

Simultaneous co-reaction of $H_3PO_4$ with DER®-664 and a type (b) monofunctional $E^2$ epoxide containing methoxymethyl functions; neutralization with $NH_4OH$. ($\overline{EEW}$ 590); 1.53 P—OH/oxirane.)

700 grams (p.35 g. moles) of DER®-664 (molecular weight about 2000 and EEW ~1000) and 300 grams (1.02 g. moles) of the glycidyl ether of 1,6-bis(methoxymethyl))-4-t-butylphenol in 1000 grams of methylene chloride was reacted at 25°–30° C. with 100 grams of 85% $H_3PO_4$ until (5 hrs.) the oxirane content (solids basis) was less than 0.1%. To 800 grams of the reaction mixture was added 400 grams of distilled water and then 60 grams of 28% aqueous ammonia. Upon stripping, a very fine, water-thinnable dispersion was obtained. No films were made from this particular dispersion, but good resistance to acetone, boiling water and flexure were exhibited by films made from a previously made ammonia-neutralized and water-thinned dispersion of essentially the same composition and cured 5–10 minutes at 190° C.

EXAMPLE 9

Inverse sequential reaction in ethanol of a nonyl substituted monofunctional type (b) $E^2$ epoxide and a bisphenol-F resin ($E^1$) with $H_3PO_4$. ($\overline{EEW}=284$); 1.15 P—OH/oxirane; electro-coatable product.

11.25 grams (0.096 g mole) of 84% aq. $H_3PO_4$ was added to a mixture of 5 grams of ethanol-B with 38.75 grams (0.0965 g mole) of the glycidyl ether of 2,6-dimethylol-4-nonylphenol at room temperature. A slight exotherm resulted. A mixture of 5 grams of ethanol-B and 31.8 grams (0.0965 g moles) of an experimental resin (nominally, the diglycidyl ether of bisphenol-F) was then added. This resulted in an exotherm which raised the temperature of the final mixture to about 100° C. The reaction mixture was allowed to cool to and stand at room temperature over a weekend.

67 grams of the product (89% non-volatiles) were stirred with 33 grams of water and the resulting dispersion neutralized (to pH 6.0) with 5.6 grams of diethylamine. Addition of 10 grams more of ethanol and 18.4 grams more of water gave a dispersion containing 50 wt.% of non-volatiles.

The dispersion was used to deposit a film on tin-free steel by electrocoating. Two steel coupons, each 1½"×4" and spaced 2" apart, were immersed to a depth of about 3" in the dispersion and 100 volts D.C. applied between the coupons (electrodes). The current drawn dropped rapidly (30 seconds) from an initial value of 150 millilamps to a value of 50 ma. The anode (negative) electrode was found to be covered with a coherent coating of the resin. After being baked 15 minutes at 175° C., the resulting film showed good resistance to boiling water.

A film of the dispersion was drawn on a tin-free steel coupon (not treated to remove oils) and showed excellent wetting. After being baked 10 minutes at 185° C., the film was resistant to acetone, showed excellent resistance to boiling water and did not crack when the coupon was bent in a 1" radius curve.

When a portion of the dispersion was thinned with water to a non-volatiles content of 5 wt.%, the thinned dispersion approximated a true solution in appearance and action. Films of the thinned dispersion electrodeposited excellently on aluminum and cold rolled steel and, after being baked 10 minutes at 175° C., showed excellent acetone resistance and withstood 50 inch pounds in the reverse impact test.

EXAMPLE 10

Inverse sequential reaction in ethanol of t-butyl substituted, monofunctional type (b) $E^2$ epoxide and a bis-F type resin ($E^1$) with phosphoric acid. ($\overline{EEW}$=254); 0.75 P—OH/oxirane; electrocoatable product.

68.4 grams (0.2 g moles) of the glycidyl ether of 2,6-dimethylol-4-t-butylphenol was mixed with 11.7 grams (0.1 g moles) 84% aq. $H_3PO_4$ at room temperature. After 5 minutes the acid number was 136 and the temperature had increased spontaneously to 90° C. The mixture was allowed to cool to 65° and then a mixture of 33 grams (0.1 g mole) of the diglycidyl ether of bisphenol-F (Resin XD-7818) and 10.14 grams of ethanol-B was added. The reaction mixture exothermed to 95° and nearly gelled; acid #75.

113 grams of the final product resin was combined with 10.1 grams of ethanol-B, 130 grams of water and 7 grams of diethylamine, to give a nearly clear dispersion having a pH of 6.3. A portion of the neutralized mixture was diluted with water to a solids content of 5 wt.% with deionized water and electrodeposited on 4" wide coupons of cold rolled steel (CRS) aluminum (Al) and tin-free steel (TFS). Each coating was subjected to reverse impact or wedge bending, boiling water and acetone rubbing tests, with the following results:

| Test | CRS | Al | TFS |
|---|---|---|---|
| Reverse Impact | Passed 100 in # | Passed 20 in # | — |
| Wedge or T-bend | — | — | 12.5% failure (0.5") |
| Boiling H<sub>2</sub>O Resistance | Excellent | Excellent | Excellent |
| Acetone Resistance | " | " | " |

EXAMPLE 11

One-step reaction in methylene chloride of phosphoric acid with mixture of methylol substituted type (b) $E^2$ epoxide and DER ®-667. No alcohol present. ($\overline{EEW}$=790); 1.42 P—OH/oxirane.

70 grams (0.039 equiv.) of DER-667 and 30 grams (0.088 equiv.) of the glycidyl ether of 2,6-dimethylol-4-t-butylphenol was dissolved in 100 ml. of $CH_2Cl_2$. To this solution, at room temperature, was added 7 grams (0.06 g moles) of 84% aq. $H_3PO_4$. The mixture evolved heat and refluxed about 1 hour. It was then heated to maintain reflux (~40° C.) for 4 hours more; epoxide content 0.16%. After 100 ml. of water and 9 grams of triethylamine were added the mixture became "glassy" and was transferred to a rotary evaporator. The neutralized mixture was stripped under vacuum until quite viscous, diluted with another 200 ml of water and stripped further until no more $CH_2Cl_2$ could be removed under 28" of vacuum at room temperature.

A film of the residual dispersion (26.5% non-volatiles) drawn on an aluminum coupon with a #18 rod and cured 10 minutes at 180° C. had excellent acetone resistance and passed 40 inch pounds reverse impact after being subjected to (and passing) a boiling water test. A film drawn on a tin-free steel coupon with a #8 rod showed excellent acetone and boiling water resistance and a wedge ("T") bend failure of 12.5% (0.5").

EXAMPLE 12

Simultaneous co-reaction of DER ®-667 ($E^1$) and a type (m) $E^2$ epoxide with phosphoric acid. ($\overline{EEW}$=465 0.85 P—OH/oxirane.)

420 grams (0.26 g moles) of DER ®-667 was dissolved in 900 grams of methylene chloride and 180 grams of isopropanol. 180 grams (0.286 g moles; 1 equiv.) of heat-fluidized (~80°-100° C.) DEN ® (Dow Epoxy Novolak)—438 was stirred in, and then 42 grams of 85% $H_3PO_4$. The mixture was held at room temperature for an hour and then heated to reflux (41°) and reacted at reflux for 16 hours. At this point the EEW (solids basis) was 49000 (% oxirane—43×100/4900=0.09+ %) and the acid number was 53. 800 grams of distilled water was stirred in and the resulting dispersion divided into two equal portions. One portion was neutralized with 50 grams of 25% aq. NaOH and the other portion with 30.5 grams of triethylamine. The caustic-neutralized portion was difficult to strip to a solids content higher than 15 wt.% but both stripped products were readily thinnable with water to give stable, homogeneous, grain-free dispersions. DEN ® 438 has an EEW of about 180, an epoxide functionality of about 3.5 and is a polyglycidyl ether of phenol-formaldehyde novolak.

EXAMPLE 13

Aqueous dispersions of neutralized reaction products of $H_3PO_4$ with various types (d, g, m and o) of $E^2$ epoxides.

An aqueous dispersion was prepared from each of the following epoxides, as described below:

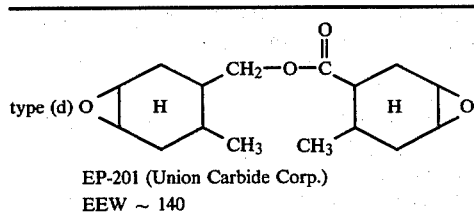

EP-201 (Union Carbide Corp.)
EEW ~ 140 type (g) 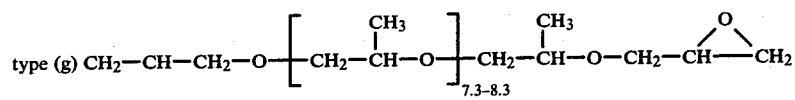

DER ®-732 The Dow Chemical Company)
EEW 305-335 type (m) Dow Epoxy Novolac (DEN ®-) 438.
"Epoxidized" phenol/formaldehyde condensation product containing an average of about 3.5 glycidyloxy groups per molecule. EEW ~ 180.

type (o) FLEXOL ® EPO. Epoxidized Soybean Oil. (Union Carbide Corp.).
EEW ~ 210.

(d)

A solution of 51.5 grams of 85% aq. $H_3PO_4$ (1.5 P—OH groups per oxirane) in 44 grams of MEK (methyl ethyl ketone) was added at room temperature to a solution of 125 grams each of EP-201 and MEK. A clear solution resulted but the system soon exothermed (despite ice bath cooling) to 80° C., became translucent and separated into two phases. After being allowed to cool (slowly) to about 45° C., the mixture was reheated to 80° C. and held at that temperature for 5 hours—at which time an analytical sample was taken and found to contain no unconverted oxirane groups. After an additional 1.5 hours at 80° C., the mixture was allowed to cool and to separate into a resin-containing (lower) phase and wet solvent (upper) phase.

Samples of the resin phase were taken for GPC (Gel Permeation Chromatographic analysis) and titrimetric analysis (for $H_3PO_4$, mono- and diester contents). 82 grams of the resin phase (~50 grams resin) was stirred with 24 grams (2 moles/mole $H_3PO_4$) of triethylamine but would not mix. Slow addition of 50 grams of water, however, gave a clear, single phase. When this was stripped to 75° C. in vacuo, it was converted to a viscous, yellowish, translucent aqueous dispersion (dispersion D) containing about 60 wt. % of non-volatiles.

The titration results showed that 26% of the oxiranes in the EP-201 had been converted to monoester groups and 46% of the $H_3PO_4$ remained unconverted. It was also evident from the molecular weight increase (over EP-201) indicated by the GPC results (and the phasing behavior observed in the reaction mixture) that a substantial degree of oligomerization had occurred.

The latter effect would be expected to be minimized by the reverse mode of combining the reactants, i.e., by dropwise addition of a dilute solution of EP-201 to a solution of the phosphoric acid kept at a kettle temperature of about 25°–50° C. Under the latter circumstances, those oxiranes not converted to monoester groups would be expected to report in the product resin almost entirely as glycol groups.

(g)

A solution of 23 grams of 85% aq. $H_3PO_4$ (P—OH/oxirane=1.5) in 19.6 grams of MEK was added slowly to a solution of 125 grams each of DER®-732 and MEK, cooled with an ice bath. The solution was allowed to warm to room temperature and did not exotherm. It was then heated to 80° C. and kept at that temperature for 0.5 hour. No oxirane could be detected in a sample of the reaction mixture. After another 1.5 hours at 80° C., the mixture was sampled for GPC and titrimetric analyses.

111 grams of the reaction mixture (50 grams "solids") was neutralized with 16 grams of triethylamine and formed a clear solution which was miscible with water. 50 grams of water was added and the solution was stripped to 75° C. in vacuo, yielding an excellent, yellowish dispersion (dispersion G) containing 50 wt. % of non-volatiles.

The analytical results showed that some oligomerization had occurred and 32% of the oxiranes had been converted to phosphomonoester groups. By difference, the proportion of oxiranes converted to glycol groups was somewhat less (due to consumption by oligomer formation) than 68%. The proportion of the $H_3PO_4$ unconverted (present as the free acid) was 46%.

(m)

Essentially in the manner of the preceding preparation, DEN®-438 was reacted with 85% aq. $H_3PO_4$ (P—OH/oxirane=3) in MEK and neutralized with 2 moles of TEA (triethylamine) per mole of acid charged. When diluted with water and stripped, the product was a clear, viscous dispersion (dispersion M) containing 48 wt. % of non-volatiles.

Titration showed that 38% of the oxiranes had been converted to monoester. There was no evidence of a molecular weight increase so the proportion of oxirane converted to glycol groups was taken to be 62% (62% of the acid charged was present as such in the product).

(o)

125.0 g Flexol EPO and 125.0 g MEK were placed in a 500 ml reactor filled with a stirrer, thermocouple, and reflux condenser. The stirrer was turned on, and the reactor was cooled to <0° C. with a dry ice/isopropanol bath. The resin/MEK solution turned translucent, then opaque as it cooled. 32.8 g (85%) $H_3PO_4$ dissolved in 28.0 g MEK were dripped in over an 8 minute period. No exotherm was observed. The cooling bath was removed and gentle heating begun. When the system reached 0° C. the resin began to clear. Stronger heating was started and the temperature rose from 0° C. to 80° C. in 25 minutes with a slight exotherm. The temperature was held at 80° C. for 15 minutes. A sample was then taken; % epoxide=0. The system was cooled and the final product, a clear, low viscosity resin solution was sampled for GPC and titrimetric analyses. 117.0 grams of the solution (50.0 g solids) was neutralized with 18.7 g TEA; the resin turned translucent as the TEA was added. 50.0 g water was added and the resulting mixture stripped of solvent and the excess TEA.

The stripped product was a viscous, yellowish, opaque dispersion (Dispersion O) containing 50 wt. % non-volatiles. When a portion of the dispersion was diluted with water to non-volatiles content of 30 wt. %, it altered to a clear, water-white dispersion.

The GPC analysis showed that a substantial molecular weight increase (oligomerization) had occurred. The proportion of oxiranes converted to phosphomonoester was 28% and the proportion of $H_3PO_4$ not converted was 43%.

EXAMPLE 14

Preparation of a DER ®-667/$H_3PO_4$ product dispersion.

dried and the other was immediately given a 2-minute bake at 200° C. The air dried and baked films were examined for appearance and the baked films tested for adhesion and flexibility.

The adhesion tests were made by scraping off a cross strip with a spatula, applying tape and pulling it off sharply. If all of the film came off, the coating adhesion was rated zero. It none of the film came off, the adhesion was rated at 5. Whether or not the scraped off material powdered was also noted.

Flexibility was tested by creasing the panel and scraping along the crease edge with a fingernail. If any material was thereby removed, the film flexibility was rated negative (−); if not, the rating was positive (+).

The results are given in Table 1 below:

TABLE 1

Effects on Film Quality of Adding Dispersions of (Neutralized) $E^2/H_3PO_4$ Products to DER ®-667/1 phr $H_3PO_4$ Dispersion

| Dispersion Added ($E^2$ Epoxide) | Film Condition | Film Appearance | Powdered When Scraped | Adhesion | Flexibility |
|---|---|---|---|---|---|
| None | Dry | White, opaque, discontinuous | Yes | | |
|  | Baked | Clear, discontinuous, some wrinkling | No | 5 | (−) |
| D EP ®-201 | Air Dried | Bluish-white, opaque, very smooth, uniform | No | | |
|  | Baked | Clear, bluish, uniform, some cratering | No | 5 | (+) |
| G DER ®-732 | Air Dried | Translucent, slightly discontinuous | No | | |
|  | Baked | Clear, bluish, non-uniform and some cratering | | | |
| O FLEXOL ®-EPO | Air Dried | Bluish-white, opaque very smooth, uniform | No | 0 | + |
|  | Baked | Clear, yellowish, very smooth and uniform | No | 5 | (−) |

DER ®-667 (EEW ~1550) was reacted in acetone/$CH_2Cl_2$ (80/20 wt. ratio) with an amount of 85% aq. $H_3PO_4$ which provided 1 part by weight of $H_3PO_4$ (100%) per 100 parts −667, at ~118° C. (in a closed vessel) for several hours. The oxirane conversion was essentially complete and 38.9% of the acid remained unconverted. The conversions of oxirane to phosphomonoester and glycol groups were 11.5 and 88.5 percent respectively.

An excellent dispersion (dispersion 667) was obtained by adding 2 moles of TEA per mole of acid charged, adding an amount of water equal to the weight of the non-volatiles present and stripping.

EXAMPLE 15

Effects on film properties of adding $E^2$/acid product dispersions of Example 13 to $E^1$/acid product dispersion of Example 14. (20/80 wt. ratio $E^2/E^1$ products.)

I. Portions of Dispersions D, G and O, such as to provide 1.25 grams each of non-volatiles, were mixed with 10 gram portions of Dispersion −667 (5 grams non-volatiles per portion) and the resulting mixtures adjusted with water to a non-volatiles content of 44% by wt. each. An additional 10 gram portion of the −667 dispersion, alone, was also adjusted to 44% non-volatiles, for comparison.

Film strips of the preceding formulations were drawn in parallel with a no. 18 wire-wound rod on each of two MYLAR ® (polyester) panels which had been cleaned with an acetone/$CH_2Cl_2$ mixture. One panel was air II. A portion of Dispersion M containing 1.25 grams of non-volatiles was mixed with 10 grams of Dispersion 667 (5 grams of non-volatiles) and the mixture adjusted with water to 44 wt. % non-volatiles. A portion of the 667 dispersion to which nothing but water was added (to 44% non-volatiles) was used for comparison. The viscosity of the M/667 mixture was distinctly the higher of the two formulations.

Film strips of the two formulations were drawn side-by-side on a tin-free steel panel, with a no. 18 wire-wound rod. Significantly better film formation was observed with the M/667 mixture. The panel was baked 2 minutes at 200° C. and the film strips tested for hardness and adhesion by scraping with a spatula. The M/667 strip was more resistant to scraping (but was observed to be less resistant to flexing). Both strips were given an adhesion rating of 5.

The formulations used in the foregoing tests (I and II) were not optimized as to proportions and did not include curing agents or other ingredients which would normally be included in commercial coatings applications. However, the results obtained serve to demonstrate that separately prepared dispersions of $E^1$/$H_3PO_4$ and $E^2$/$H_3PO_4$ products can be combined and that certain properties of the $E^1$-derived dispersions can be selectively modified by addition of minor amounts of the $E^2$-derived dispersions.

EXAMPLE 16

(A) Preparation of 2,6-dimethylol-p-t-butylphenol (DMPTBP)

200 grams (1.331 moles) of para-t-butylphenol and 400 ml. of water were placed in a 2-liter, 3-neck, round bottom flask fitted with a thermometer, a stirrer and a dropping funnel. The flask was placed in a water bath, the contents stirred and 106.6 grams (1.331 moles) of 50% aq. NaOH added. The temperature of the resulting slurry was adjusted to 30° C. (by cooling) and 227 grams (~2.8 moles) of 37% formalin added. The mixture was heated to 60° C. and stirred at that temperature for 4 hours. It was then cooled to 35° C. and 444 ml. (1.331 moles) of 3 N aq. HCl were added. Enough dilute acetic acid was then added to make the mixture just acid. 100 ml. of chloroform was stirred in and the phases allowed to separate. The chloroform layer, containing essentially all of the product resin, was removed, washed once with water, dried by azeotropic distillation and stripped in vacuo. 276 grams (99% yield) of the title product was obtained as a resinous residue which crystallized on standing; equivalent wt. 220 grams per phenolic —OH (vs 212, theoretical).

(B) Preparation of the glycidyl ether of DMPTBP (DMPTBP-epoxide, or DMPTBPE).

196 grams (1.09 moles) of the preceding resin was mixed with 1010 grams (10 moles) of epichlorohydrin. 1.96 grams of coupling catalyst (Benzyl trimethyl ammonium chloride, BTMAC) was added and the solution refluxed at 120° C. for one hour to effect phenolic-OH/oxirane adduction. 665 ml (1.996 moles) of 3 N aq. NaOH, saturated with $Na_2CO_3$, was divided into two portions of 444 and 221 ml. The resin solution and the first portion of aqueous caustic were stirred together at ~25° C. for one hour. The spent caustic phase was separated and removed. The second portion of fresh caustic was then stirred with the resin solution an hour at ~25° C., separated and removed. The resin solution was washed, dried and stripped, thereby giving 266 grams of the title epoxide (EEW 311, vs 267 theoretical).

EXAMPLE 17

(A) Preparation of the 1:1 adduct of 2,6-dimethylol-p-t-butylphenol and DER ®-331.

63.4 grams of DER ®-331 (the diglycidyl ether of Bisphenol A; EEW ~190), 36.6 grams of the title phenol and 1 gram of benzyl trimethyl ammonium chloride catalyst were heated to 100° C. and maintained at that temperature until (2.3 hours) the epoxide content was 7.46% (vs 7.18% theoretical for 1:1 adduct).

(B) Preparation of the 1:1 adduct of the diglycidyl ether of bisphenol-F with 2,6-bis(methoxymethyl)-4-t-butylphenol.

116 grams (0.7 equiv.) of an experimental resin, consisting essentially of the diglycidyl ether of bisphenol-F and having an EEW of 165, was mixed with 84 grams (0.35 equiv.) of the above-named phenol and 1 gram of benzyl trimethyl ammonium chloride. The mixture was heated at 130° until (6 hours) the % epoxide therein was 11.8 (EEW 380). Another gram of the onium chloride coupling catalyst was added and heating was continued 2 more hours. The % epoxide in the mixture was then 7.3%, corresponding to an EEW of 590 (vs. 570 theoretical for the 1:1 adduct).

EXAMPLE 18

Effect of P—OH/oxirane ratio of dispersibility of neutralized reaction products of $H_3PO_4$ and 2,6-di(methoxymethyl)-4-t-butylphenyl glycidyl ether (DMMPTBPE).

DMMPTBPE was reacted, as a 50% solution in dioxane, for 3 hours at 75° C. with amounts of 85% $H_3PO_4$ which provided from 0.5 to 3 P—OH groups per oxirane. Water and enough triethylamine (TEA) to establish a pH of about 10 were stirred into each reaction mixture and the dioxane stripped off. The results are summarized in Table 2 below:

TABLE 2

| Run | 1 | 2 | 3 | 4 |
|---|---|---|---|---|
| Grams DMMPTBPE | 32 | 32 | 32 | 32 |
| Grams 85% $H_3PO_4$ | 1.95 | 3.9 | 5.35 | 11.7 |
| Wt. % $H_3PO_4$ | 5.7 | 10.8 | 15.4 | 26.7 |
| P-OH/oxirane | 0.5 | 1.0 | 1.5 | 3.0 |
| Dispersible as TEA salt) in water? | No | Yes | Yes | Yes |

EXAMPLE 19

Preparation of water-thinned, TEA salified $H_3PO_4$/2,6-dimethylol-4-t-butylphenyl glycidyl ether (DMPTBPE) reaction product.

300 grams of DMPTBPE were dissolved in 450 grams of methylene chloride and the resulting solution was added to a mixture of 57 grams of 85% $H_3PO_4$, 150 grams of ethanol and 150 grams of methylene chloride. The mixture was stirred for 15 hours at room temperature and then at reflux temperature (42° C.) until (3 hours) no measurable content of oxirane groups remained and the acid number was 160. The reaction mixture was then stirred with 300 grams of distilled water for an hour and phase separation was allowed to occur. The (strongly acid) aqueous phase (378 grams) was then replaced with fresh distilled water and the organic and aqueous phases agitated together while 20 grams of TEA was added. The mixture (dispersion) was then stripped under reduced pressure to yield a viscous, almost water-clear solution of the salified product (~33% solids).

EXAMPLE 20

Effect of water/acid ratio on composition and properties of reaction product from aq. $H_3PO_4$ and DMMPTBPE. (3 P—OH/oxirane.)

Each of four 100 gram (0.229 equiv.) portions of the glycidyl ether of 2,6-di(methoxymethyl)-4-t-butylphenol was dissolved in an equal weight of dichloromethane. Aqueous phosphoric acid (of successively lower concentrations; 94, 85, 65 and 40 wt. %'s) was added to each solution in an amount such as to provide 3 P—OH per oxirane. Each mixture was heated to reflux temperature with stirring. The 40% acid did not give a single phase mixture but the components of the other three mixtures were compatible. Each mixture was allowed to reflux until epoxide conversion was essentially complete. The heterogeneous reaction with the 40% acid was slow, requiring 23 hours, but the other reactions were complete in 6 hours.

Each reaction mixture was analyzed for free acid, monoester and diester contents and the contents of hydrolysis product (2,6-di(methoxymethyl)-4-t-butylphenyl ether of glycerol) calculated.

An additional run with 85% phosphoric acid, but in an amount such as to provide only 1.5 P—OH per oxirane, was carried out. This (homogeneous) reaction was also complete in 6 hours.

The results for the five runs are summarized in Table 3 following:

TABLE 3

| Run | Grams H$_3$PO$_4$ | H$_2$O | Acid Strength % | Mole Ratio Acid/H$_2$O | P—OH Oxirane | Mole % Phosphate Present in Product As | | | % Oxirane Converted to | | | % Free H$_3$PO$_4$ in Product Dry Basis | % H$_2$O In Product** |
|---|---|---|---|---|---|---|---|---|---|---|---|---|---|
| | | | | | | Monoester | Diester | Free Acid | Monoester | Diester | Glycol | | |
| A | 21.30 | 1.36 | 94 | 3:1 | 3.0 | 42.5 | 3.7 | 53.8 | 42.5 | 7.4 | 50.1 | 9.44 | 0 |
| B | 22.43 | 3.96 | 85 | 1:1 | 3.0 | 32.7 | 2.0 | 65.3 | 32.7 | 4.0 | 63.3 | 11.96 | 1.12 |
| C | 22.43 | 12.08 | 65 | 1:3 | 3.0 | 29.8 | 1.8 | 68.4 | 29.8 | 3.6 | 66.6 | 12.53 | 6.93 |
| D | 22.48 | 33.65 | 40 | 1:8 | 3.0 | 0 | 0 | 100.0 | 0 | 0 | 100.0 | 18.34 | 18.89 |
| E | 11.21 | 1.98 | 85 | 1:1 | 1.5 | 48.2 | 8.0 | 43.8 | 24.0 | 8.0 | 68.0 | 4.42 | 0.04 |

*H$_2$O and solvent free.
**Solvent free.

Each of the reaction mixtures of resins A through E was mixed with water, adjusted to pH ~9 with triethyl amine and stripped. The dispersibility of the salified products was as follows:

A. Dissolved in water at 48% non-volatiles level. Stable dispersion at 20% non-volatiles.

B. Dispersions at 51% and 20% non-volatiles.

C. Mixtures with water separated at 53% and 20% non-volatiles.

D. Mixtures with water separated at 44% and 20% non-volatiles.

E. Dissolved in water at 23% non-volatiles. Stable dispersion at 20% non-volatiles.

It is evident from the data in Table 3 that the dispersibility of the salified DMMPTBPE/H$_3$PO$_4$ products was effected by both glycol/ester ratio and free acid content. It has been found that the diester groups, formed by adduction of two oxirane groups with one molecule of H$_3$PO$_4$, readily hydrolyze to equivalent amounts of monoester and glycol. Accordingly, when any substantial amount of diester is present, the glycol to monoester ratio of interest is the ratio arrived at by assuming the diester to be hydrolyzed. The adjusted glycol to monoester ratios and the free acid contents for runs A–C and E are:

| A. | 53.8 ÷ 46.2 = 1.16 | 9.44% H$_3$PO$_4$ |
|---|---|---|
| B. | 65.3 ÷ 34.7 = 1.88 | 11.96% H$_3$PO$_4$ |
| C. | 68.4 ÷ 31.6 = 2.16 | 12.53% H$_3$PO$_4$ |
| E. | 72.0 ÷ 28.0 = 2.57 | 4.42% H$_3$PO$_4$ |

It is apparent that salified resins of the foregoing type containing relatively large amounts of glycol groups can be dispersed in water if excessively large amounts of free acid are not also present. However, the amount of free acid present can always be reduced (as in Example 19 herein). Also, the effects of free acid on dispersibility are less noticeable in products derived from higher functionality epoxides (such as the diglycidyl ether of 5,6,5',6'-tetra(methoxymethyl)bis-phenol-A, for example).

EXAMPLE 21

Reaction of 940 EEW oligomer of 2,6-dimethylol-4-t-butylphenyl glycidyl ether with 85% H$_3$PO$_4$ in MEK (1.5 P—OH/oxirane: H$_3$PO$_4$=5.0% of reactants). Product neutralized and dispersed in H$_2$O.

One hundred grams of the oligomer (formula (n), average value of u=~1.5) was mixed with an equal weight of MEK (methyl ethyl ketone) and 6.13 grams of the acid was stirred in. The mixture was heated and refluxed at about 80° C. until (5 hours) the epoxide content was 0.3%.

Five grams of triethyl amine (TEA) were added and the mixture became cloudy. 70 grams of MEK were readily stripped off but when 200 grams of water were added, two separate formed, and further MEK removal became difficult. Addition of 5 grams more of TEA made stripping easier and the mixture was stripped to a kettle temperature of 100° C. under 19 inches of vacuum. The residium, upon being diluted with another 100 grams of water and adjusted to pH 9 with TEA, gave a finely dispersed, salified resin which was flowable at a non-volatiles level of 25%.

EXAMPLE 22

Use of salified E$^2$-derived resin of Example 19 as curing agent for a salified reaction product of H$_3$PO$_4$ with two different E$^1$ epoxides.

An E$^1$-derived resin was prepared by sequential reaction of DER ®-667 and DER ®-331 with H$_3$PO$_4$. 375 grams of DER ®-667 were dissolved in a mixture of 500 grams of CH$_2$Cl$_2$ and 100 grams of isopropanol. 36.0 grams of 85% H$_3$PO$_4$ were added in the resulting solution stirred at room temperature for 15 hours. No unconverted epoxide could be detected. 125 grams of DER ®-331 and another 100 grams of CH$_2$Cl$_2$ were added and stirring was continued until, again, no epoxide could be detected. The acid number was 65.

875 grams of distilled water and 49.8 grams of triethyl amine were added and the resulting dispersion was stripped of solvents. The residual dispersion (pH 8) had a very low opacity and showed excellent stability.

The salified resin dispersion was thinned with water to a non-volatiles level of 20 wt. % and coated on aluminum test panels as films drawn with a #10 wire wound rod. Good wetting and excellent film flow were obtained. However, cure times of about 25 minutes at 195° C. and 9 minutes at 225° C. were required to harden the films. When 1 wt. % of toluene sulfuric acid was added to the dispersion and films drawn as before, the required cure times were reduced to 15 minutes at 195° C. and 4 minutes at 225° C. but the resistance of the cured films to acetone was only marginal (about 20 double rubs, or less, passed).

To 100 grams of the foregoing resin dispersion was added 100 grams of the resin dispersion of Example 19 and 100 grams of distilled water. Coatings of the resulting dispersion were drawn as above on aluminum. Only 8 minutes at 205° C. was required for a full cure, without addition of an accelerator, and the cured films passed 50 acetone double rubs. When 1% of toluene sulfonic acid was included in the coatings, a full cure was obtained in 3 minutes at 205° C.

The $E^1$-derived resin of the latter example is representative of a preferred group of such resins, namely, co-reaction products of orthophosphoric acid with two polyether epoxides of the DGEBA type, one having an n value of from about 0 to about 1 and the other having an n value of from about 8 to about 15. Particularly preferred among such products are those in which n for one resin (such as DER ®-331) is about 0 and n for the other resin (such as DER ®-667) is about 10–13.

The $E^2$-type resins deriveable from epoxides of formulas (b) and (p) are highly advantageous for the practice of the present invention. Such epoxides in which $R^5$ is alkyl of from 3 to 10 carbons are particularly preferred for the preparation of $E^2$-derived resins. Among the latter, those compounds in which p is 1 and $R^5$ is t-butyl or normal nonyl are most preferred as conferring superior ability on the mixed $E^1$ and $E^2$-derived resin dispersions to wet hydrophobic substrates, such as aluminum stock which is not oil-free.

The diglycidyl ether of 2,6,2',6'-tetra(methoxymethyl) bisphenol-A is a preferred alkoxymethyl substituted epoxide (formula (1) for preparation of $E^2$-derived resins (dispersions).

The relative proportions of the $E^1$- and $E^2$-derived resins (salified) in the composition of the invention can vary widely, depending on the characteristics desired in the end product (cured coating, sealer, surface active material, primer or whatever). In most applications, an end product whose properties are essentially those of the $E^1$-derived resin will be desired and the mole ratio of $E^1$- to $E^2$-epoxide-derived species may have a value of up to about 100. However, in other applications the $E^1$ epoxide may act more as a modifier than as the main epoxide component and the mole ratio of $E^1$-derived to $E^2$-derived species in the end product may have a value down to about 0.1. In those instances where the $E^2$-epoxide (or a low molecular weight $E^1$-epoxide) undergoes some oligomerization during reaction with the acid, each monomer unit in the oligomer is counted as an individual molecule in assessing the $E^1/E^2$ ratio.

The content of free (unesterified) phosphoric acid in the mixed products can vary from none up to about 85 parts by weight per hundred parts of epoxide-deriveable molecules. However, unless the contemplated end use of the salified, mixed product requires enhanced fire retardancy or the ability to release a substantial amount of a dissociable base (to a strongly acid environment or upon heating), "free" acid contents of more than about 5 weight percent will generally be undesirable and contents of about 1 part by weight or less of $H_3PO_4$ per hundred parts of epoxide-deriveable (or -derived) molecules will be preferable.

What is claimed is:

1. The process for preparing water-thinnable, base-salified reaction products of orthophosphoric acid and polyether epoxides which comprises:

(I) reacting orthophosphoric acid with (1) a polyether epoxide resin $E^1$ consisting essentially of molecules, each of which is of the formula

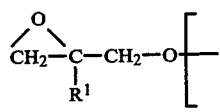

(a)

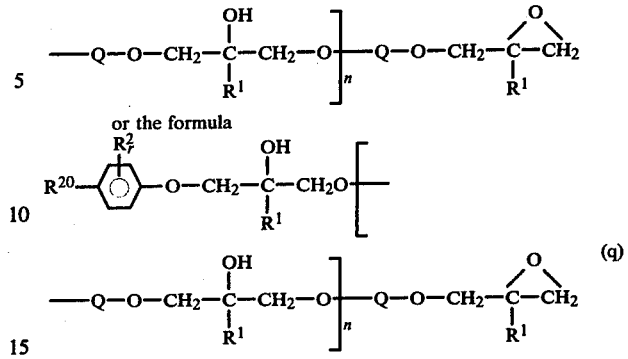

or the formula

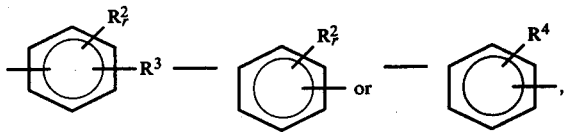

wherein Q, independently, in each occurence, is

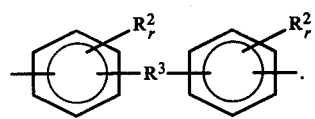

n is an integer of from 0 to 40, r is zero, 1 or 2 and, independently in each occurrence;

$R^1$ is H, methyl or ethyl, $R^2$ is —Br, —Cl or a $C_1$ to $C_4$ alkyl or alkenyl group, $R^3$ is a $C_1$-$C_4$ alkylene or alkenylene group, >$C(CF_3)_2$, —CO, —SO$_2$—, —S—, —O— or a valence bond, and $R^4$ is —Br, —Cl or a $C_1$ to $C_4$ alkyl or alkenyl group, $R^{20}$ is H or alkyl of 1 to 12 carbons; and (2) $E^2$, a vicinal epoxide, other than one of formula (a) or (q), which has an EEW (epoxide equivalent weight) within the range of from about 90 to about 2000 and is convertible to a water-dispersible material by reaction with orthophosphoric acid and neutralization with a base, said reaction being carried out by contacting $E^1$ and $E^2$ with an orthophosphoric acid source material and from 0 to 25 molecular proportions of water per molecular proportion of $H_3PO_4$ provided by said source material until the fraction of the oxirane groups in $E^1$ and $E^2$ converted is at least sufficient to render the resulting mixed product water-thinnable when contacted with a base, the amount of orthophosphoric acid included as such in said source material, or obtainable therefrom by hydrolysis, being such as to provide at least 0.3 P—OH groups per oxirane group, and the mole ratio of $E^1$ to $E^2$ epoxides being within the range of from about 0.1 to about 100, and (II) contacting the resulting mixed reaction product with at least enough of a base to render it water-thinnable.

2. The process of claim 1 in which Q, in all occurrences, is

3. The process of claim 1 in which $E^2$ consists essentially of molecules, each of which, independently, is of a kind represented by one of formulas (b) through (p) following:

(b) a methylol- or alkoxymethyl-substituted phenyl-glydicyl ether of the following formula

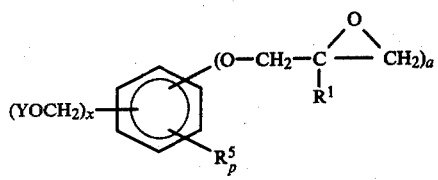

wherein
Y is H or a $C_1$ to $C_4$ alkyl or alkenyl group, each $YO-CH_2-$ group is either ortho or para to a glycidyloxy group,
x is 1, 2 or 3, p is 0 or 1 and a is 1 or 2,
$R^1$, independently in each occurrence, is H, methyl or ethyl,
$R^5$ is a $C_1$-$C_{12}$ alkyl, alkenyl, cycloalkyl, phenyl, alkylphenyl, phenalkyl, phenoxy, —Br, —Cl group or a

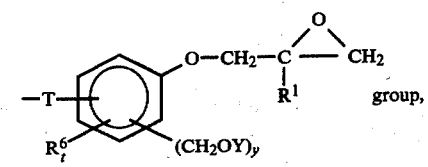

wherein
y is 0, 1 or 2
Y and $R^1$ are as above defined,
T is a $C_1$-$C_4$ alkylene or alkenylene group, $>C(CF_3)_2$, $-SO_2-$, $-S-$, $-O-$ or a valence bond,
$R^6$ is —Br, —Cl or a $C_1$-$C_{12}$ alkyl, alkenyl, cycloalkyl, phenyl, alkylphenyl, phenalkyl or phenoxy group, and t is 0 or 1;
with the proviso that (x+a) cannot exceed 4 and (x+y) is from 2 to 4;

(c) a methylol- or alkoxymethyl-substituted, (2,3-epoxy) propylbenzene of the formula

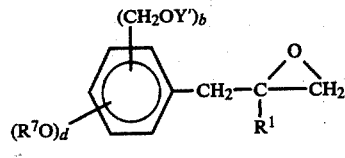

wherein:
b is 1 to 3, d is 0 or 1,
$R^7$ is $C_1$-$C_{12}$ alkyl or

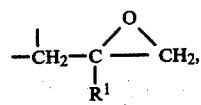

Y' is H or a $C_1$ to $C_4$ alkyl or alkenyl group,
$R^1$ is H, methyl or ethyl, with the proviso that (b+d) cannot exceed 3;

(d) di- and trioxides of acyclic or cyclic, $C_4$ to $C_{28}$ hydrocarbons or esters containing two or three non-aromatic, carbon-to-carbon double bonds and, optionally, a —Br, —Cl or —F or hydroxy substituent;

(e) epoxy ethers of the formula $R^8-O-R^9$, wherein each of $R^8$ and $R^9$ is the same or a different monovalent radical derivable by abstraction of hydrogen from a $C_3$-$C_{12}$ aliphatic-, alicyclic- or phenalkylene-oxide;

(f) 2,3-epoxypropyl halides, alcohols or esters of the formula

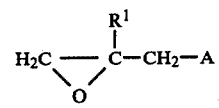

wherein A is —Cl, —Br, —OH or

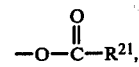

$R^1$ is —H, —$CH_3$ or —$C_2H_5$ and $R^{21}$ is a $C_1$-$C_{15}$ hydrocarbyl group;

(g) glycol monoethers of the formula

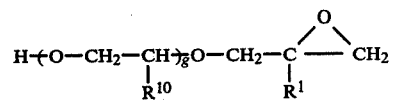

and glycol diethers of the formula

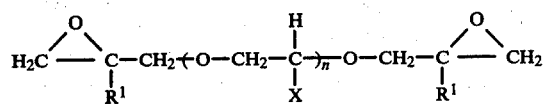

wherein,
$R^1$ is —H, —$CH_3$ or —$C_2H_5$, $R^{10}$ is —H or —$CH_3$, X is —H, —$CH_3$ or —$C_2H_5$, g is 1, 2 or 3 and h is an integer of from 2 to about 10;

(h) diglycidyl ether or esters of the formula

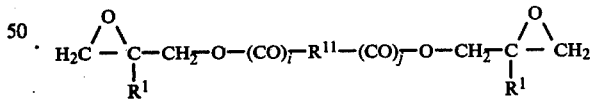

wherein $R^{11}$ is a divalent hydrocarbon radical of from 2 to 20 carbons, $R^1$ is —H, —$CH_3$ or —$C_2H_5$ and i and j independently are 0 or 1;

(i) mono or diglycidyl ethers of

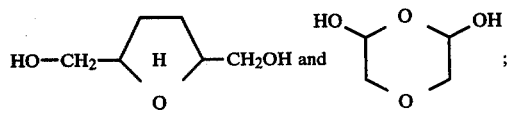

(j) mono-, di- or triglycidyl ethers of glycerine;
(k) trifunctional aromatic epoxides

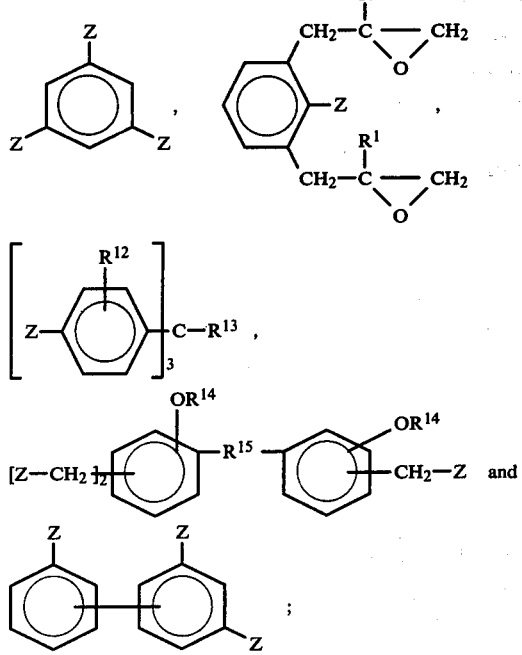

wherein Z is

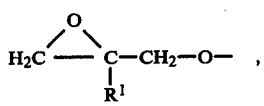

$R^{12}$ is $C_1$-$C_2$ alkoxy, $C_1$-$C_6$ alkyl or $C_2$-$C_6$ alkenyl
$R^{13}$ is H, $C_1$-$C_{12}$ alkyl or $C_2$-$C_{12}$ alkenyl,
$R^{14}$ is a $C_1$-$C_8$ alkyl, alkenyl, cycloalkyl, cycloalkenyl or aralkyl group, ortho or para to those Z—$CH_2$— moieties on the benzene ring to which said group is attached, $R^1$ is as previously defined and $R^{15}$ is a $C_1$-$C_4$ alkylene or alkenylene group or —$SO_2$—;

(l) tetraglycidyl ethers of the formula

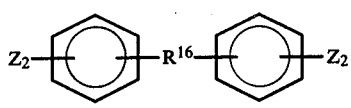

wherein $R^{16}$ is a $C_1$ to $C_6$, divalent aliphatic hydrocarbon radical,

$>C(CF_3)_2$, —$SO_2$—, —S—, —O— or a valence bond and Z is

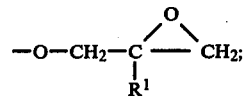

(m) tri- to pentafunctional epoxy novolaks of the formula

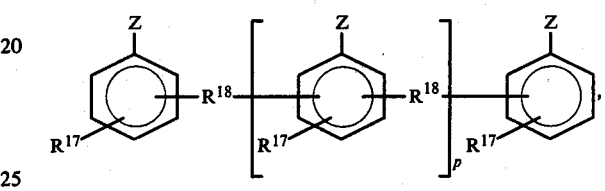

wherein
p is 1 to 3,
$R^{17}$ is H or —$CH_3$, independently in each occurrence,
$R^{18}$ is an alkylene group of 1 to 4 carbons and
Z is

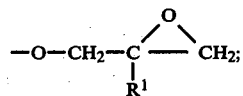

(n) methylol substituted, oligomeric monoepoxides of the formula

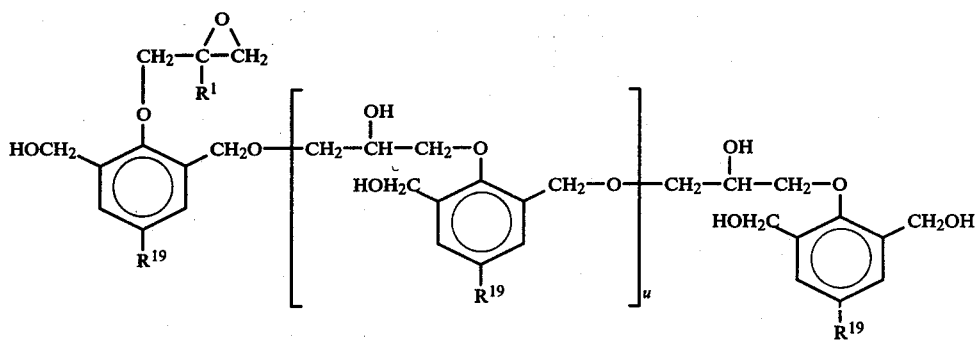

wherein
u is 0, 1, 2 or 3, $R^1$, independently in each occurrence, is H, methyl or ethyl and $R^{19}$, independently in each occurrence, is a $C_1$-$C_{12}$ alkyl, alkenyl, cycloalkyl, phenyl, phenalkyl or alkylphenyl group;

(o) epoxidized triglycerides of unsaturated fatty acids of up to 18 carbons each; and (p) one to one adducts of substituted phenols with diglycidyl ethers of substituted bis-phenols, of the formula

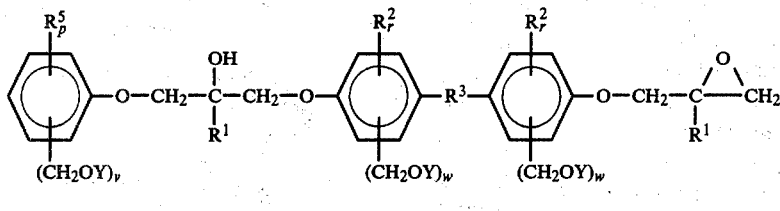

wherein $R^1$, $R^2$, $R^3$ and r are as defined in preceding formula (a), Y, $R^5$ and p are as above defined in formula (b), v is 1, 2 or 3 and w, independently in each occurrence, is 0, 1 or 2.

4. The process of claim 2 in which $E^1$ consists essentially of molecules of formula (a).

5. The process of claim 3 in which $E^2$ consists essentially of molecules, each of which, independently, is of a kind represented by one of formulas (b), (c), (n) and (p).

6. The process of claim 2 in which Q, in essentially all occurrences is either

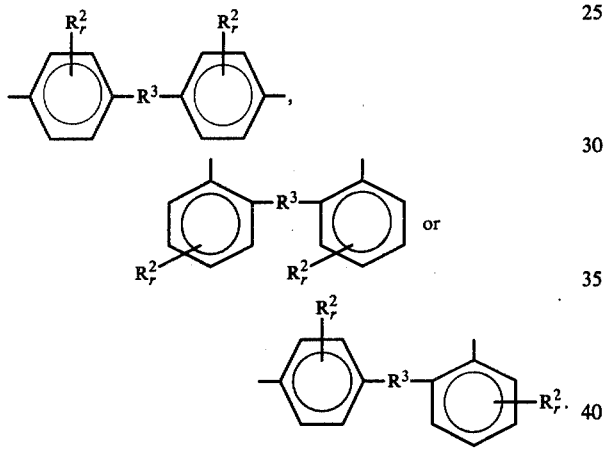

7. The process of claim 3 in which $E^2$ consists essentially of molecules, each of which, independently, is of a kind represented by one of formulas (d), (g), (m) or (o).

8. The process of claim 5 in which $E^2$ consists essentially of molecules of formula (b).

9. The process of claim 5 in which $E^2$ consists essentially of molecules of formula (n).

10. The process of claim 7 in which $E^2$ consists essentially of molecules of formula (d).

11. The process of claim 7 in which $E^2$ consists essentially of molecules of formula (m).

12. The process of claim 1 in which the amount of said acid source material employed is sufficient to convert essentially all of the oxirane groups in $E^1$ and $E^2$ and $E^1$ is reacted with the acid source material before $E^2$ is introduced to the reaction mixture.

13. The process of claim 12 in which $E^1$ is a mixture of two epoxides of formula (a), one of which has an average n value of from about 10 to about 13 and the other has an average n value of from 0 to about 1; and $E^2$ is an epoxide of formula (b) or (n).

14. The process of claim 1 in which said base is an amine of the formula $NR_3$, wherein each R is H, methyl or ethyl independently, except that not more than one R is H.

15. The process of claim 14 in which said base is triethylamine.

16. The process of claim 1 in which the reaction is carried out in a reaction medium, water and said base are added to the reaction mixture and said medium is removed, thereby forming an aqueous dispersion of the neutralized, mixed reaction products of $E^1$ and $E^2$ with said acid source material.

17. A water-thinnable, resinous phosphate composition comprising:
  (A) resin molecules, each of which is derivable by conversion to 1,2-glycol- or to beta-hydroxy phosphomonoester groups of the oxirane groups in an $E^1$ epoxide represented by one of formulas (a) and (q) in claim 1,
  (B) other molecules, each of which is derivable by conversion to 1,2-glycol- or beta-hydroxy phosphomonoester groups of the oxirane groups in $E^2$, a vicinal epoxide other than those of formulas (a) and (q), having an EEW within the range of from about 90 to about 2,000, the mole ratio of said $E^1$-derivable molecules to said $E^2$-derivable molecules being within the range of from about 0.1 to about 100, and the number ratio of glycol to monoester groups in each of said types of molecules being within the range of from zero to about 18;
  (C) from 0 to about 85 parts by weight of ortho phosphoric acid ($H_3PO_4$) per 100 parts by weight of said $E^1$- and $E^2$-derivable molecules, and
  (D) one or more bases, in such amount that at least enough of the P—OH moieties in said $E^1$ and $E^2$-derivable molecules are salified thereby to render them dispersible together in water.

18. The composition of claim 17 wherein said other molecules comprise benzene rings substituted with methylol or loweralkoxymethyl groups.

19. The composition of claim 17 wherein said base is a fugitive base.

20. The composition of claim 19 wherein said base is an amine of the formula $NR_3$, wherein R is H, methyl or ethyl, independently, except that not more than one R is H.

21. The composition of claim 20 in which said base is triethylamine.

22. The composition of claim 17, in an aqueous dispersion.

23. A dispersion of claim 22, in which said composition is heat-convertible, coated on a substrate.

24. The coating of claim 23, dehydrated, desalified and cured in place on said substrate, by heating.

25. The composition of claim 17 wherein Q, in said formulas (a) and (q), is as defined in claim 6.

26. The composition of claim 17 wherein said resin molecules are derivable from an $E^1$ epoxide as defined by formula (a) in claim 1.

27. The composition of claim 26 wherein Q, in said formula (a), is as defined in claim 6.

28. The composition of claim 18 in which said other molecules are deriveable from $E^2$ epoxide molecules, each of which, independently, is of a kind represented by one of formulas (b), (c), (n) and (p) in claim 3.

29. The composition of claim 28 in which said other molecules are deriveable from an $E^2$ epoxide of formula (b) or (n) in claim 3.

30. The composition of claim 29 in which said resin molecules are deriveable from a mixture of two $E^1$ epoxides of formula (a), Q being as defined in claim 6, the average n value for one of said two epoxides being from about 10 to about 13 and the other having an average n value of from 0 to about 1.

31. The composition of claim 17 wherein said other molecules are deriveable from $E^2$ epoxide molecules, each of which, independently, is of a kind represented by one of formulas (d), (g), (m) and (n) in claim 3.

32. The composition of claim 31 in which said $E^2$ epoxide molecules are of said formula (d).

33. The method of preparing the composition of claim 17 which comprises combining:
(1) a reaction product of orthophosphoric acid with an $E^1$ epoxide as defined in claim 1,
(2) a reaction product of orthophosphoric acid with an $E^2$ epoxide as defined in claim 3, and
(3) sufficient of a base to render the combination dispersible in water.

UNITED STATES PATENT AND TRADEMARK OFFICE
CERTIFICATE OF CORRECTION

PATENT NO. : 4,164,487
DATED : August 14, 1979
INVENTOR(S) : Patrick H. Martin

It is certified that error appears in the above-identified patent and that said Letters Patent are hereby corrected as shown below:

Column 1, formula at line 50 should be:

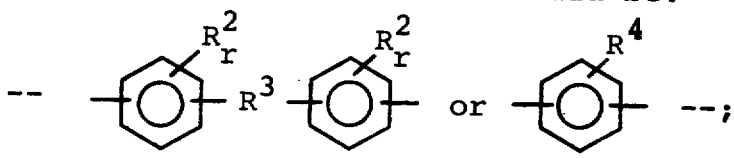

Column 3, line 31, insert -- of -- after "or" ;

Column 3, line 46, formula should be same as at Column 1, line 50;

Column 5, line 42, delete hyphen between "$E^1$" and "acid";

Column 7, line 1, delete "consequent" and insert -- consequence -- ;

Column 11, line 41, insert -- 15% of n = 2 -- after the word "about" ;

UNITED STATES PATENT AND TRADEMARK OFFICE
CERTIFICATE OF CORRECTION

PATENT NO. : 4,164,487

DATED : August 14, 1979

INVENTOR(S) : Patrick H. Martin

It is certified that error appears in the above-identified patent and that said Letters Patent are hereby corrected as shown below:

Column 12, formula at line 15 should be:

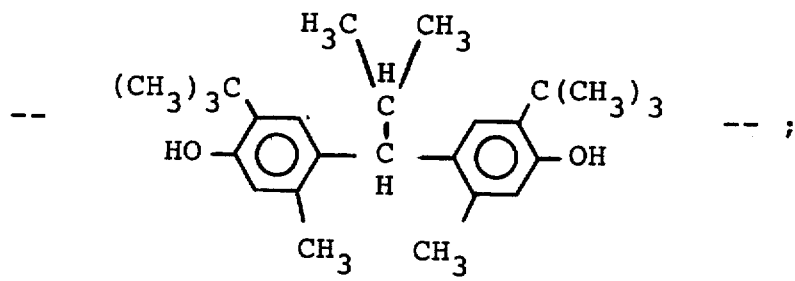

Column 19, line 62, delete "and" and insert -- or -- ;

Column 26, line 19, delete the first "to" and insert -- of -- ;

Column 32, line 64, "milliamps" misspelled;

Column 37, line 6, insert -- a -- after "to" ;

Column 40, line 1, delete the second "of" and insert -- on -- ;

UNITED STATES PATENT AND TRADEMARK OFFICE
CERTIFICATE OF CORRECTION

PATENT NO. : 4,164,487

DATED : August 14, 1979

INVENTOR(S) : Patrick H. Martin

It is certified that error appears in the above-identified patent and that said Letters Patent are hereby corrected as shown below:

Column 41, Table 3, delete the number "1" in the heading of the first column; insert -- * -- after "Basis" in the second-to-last column heading;

Column 42, line 23, insert -- phases -- after "separate";

Column 44, line 6, insert -- of -- after "or" ;

Column 44, formula at line 20 should be same as at Column 1, line 50;

Column 45, formula at line 57 should read:

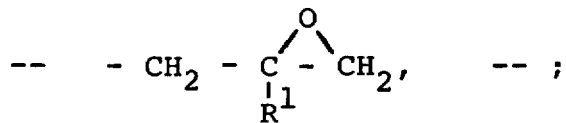

UNITED STATES PATENT AND TRADEMARK OFFICE
CERTIFICATE OF CORRECTION

PATENT NO. : 4,164,487
DATED : August 14, 1979
INVENTOR(S) : Patrick H. Martin

It is certified that error appears in the above-identified patent and that said Letters Patent are hereby corrected as shown below:

Column 46, formula at line 63 should be:

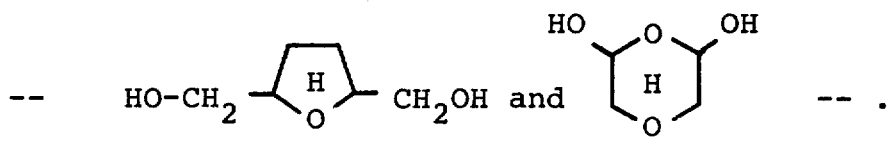

Signed and Sealed this

Twentieth Day of November 1979

[SEAL]

Attest:

RUTH C. MASON
Attesting Officer

LUTRELLE F. PARKER
Acting Commissioner of Patents and Trademarks